United States Patent [19]
Yamamoto

[11] Patent Number: 5,848,059
[45] Date of Patent: Dec. 8, 1998

[54] NODE DEVICE USED IN NETWORK SYSTEM FOR PACKET COMMUNICATION, NETWORK SYSTEM USING SUCH NODE DEVICES, AND COMMUNICATION METHOD USED THEREIN

[75] Inventor: Mitsuru Yamamoto, Yokohama, Japan

[73] Assignee: Canon Kabushiki Kaisha, Tokyo, Japan

[21] Appl. No.: 677,425

[22] Filed: Jul. 2, 1996

[30] Foreign Application Priority Data

Jul. 3, 1995 [JP] Japan .................................. 7-189786
Jul. 7, 1995 [JP] Japan .................................. 7-195999
Jun. 27, 1996 [JP] Japan .................................. 8-186807

[51] Int. Cl.$^6$ .................................................. H04L 12/42
[52] U.S. Cl. .......................... 370/258; 370/420; 370/463
[58] Field of Search .................................. 370/254, 257, 370/258, 400, 406, 423, 424, 450, 451, 452, 453, 460, 463, 401, 420, 421, 434; 340/825.05, 825.06; 359/118, 119, 124, 125

[56] References Cited

U.S. PATENT DOCUMENTS

| | | | |
|---|---|---|---|
| 4,899,142 | 2/1990 | Nakayashiki et al. | 370/434 |
| 5,182,747 | 1/1993 | Frenzel, III et al. | 370/452 |
| 5,355,124 | 10/1994 | Kochem et al. | 370/434 |
| 5,369,515 | 11/1994 | Majima | 359/125 |

OTHER PUBLICATIONS

B. Mukherjee, "WDM–Based Local Lightwave Networks, Part II: Multihop Systems," IEEE Network, vol. 6, No. 4, pp. 20–32 (Jul. 1992).

*Primary Examiner*—Chi H. Pham
*Assistant Examiner*—Ricky Ngo
*Attorney, Agent, or Firm*—Fitzpatrick, Cella, Harper & Scinto

[57] ABSTRACT

A node device for performing packet communication using a transmission line composed of a plurality of channels is connectable to a network having a plurality of node devices, each of the plurality of node devices connecting the transmission line to a sub-transmission line. The node device a has packet processor for processing a packet, first, second, and third devices for outputting a packet, a memory device and a transmitter. The first device corresponds to each of the plurality of channels and outputs a packet input on a predetermined one of the plurality of channels to a side of the sub-transmission line or a side of the transmission line. The second device corresponds to each of the plurality of channels and outputs a packet transmitted through the sub-transmission line to the transmission line side or the packet processor side. The third device outputs a packet supplied thereto from the packet processor to the sub-transmission line side. The memory device corresponds to each of first and second devices, and temporarily stores a packet output from each of the first and second devices. The transmitter transmits outputs from the memory device in channels different from each other.

71 Claims, 21 Drawing Sheets

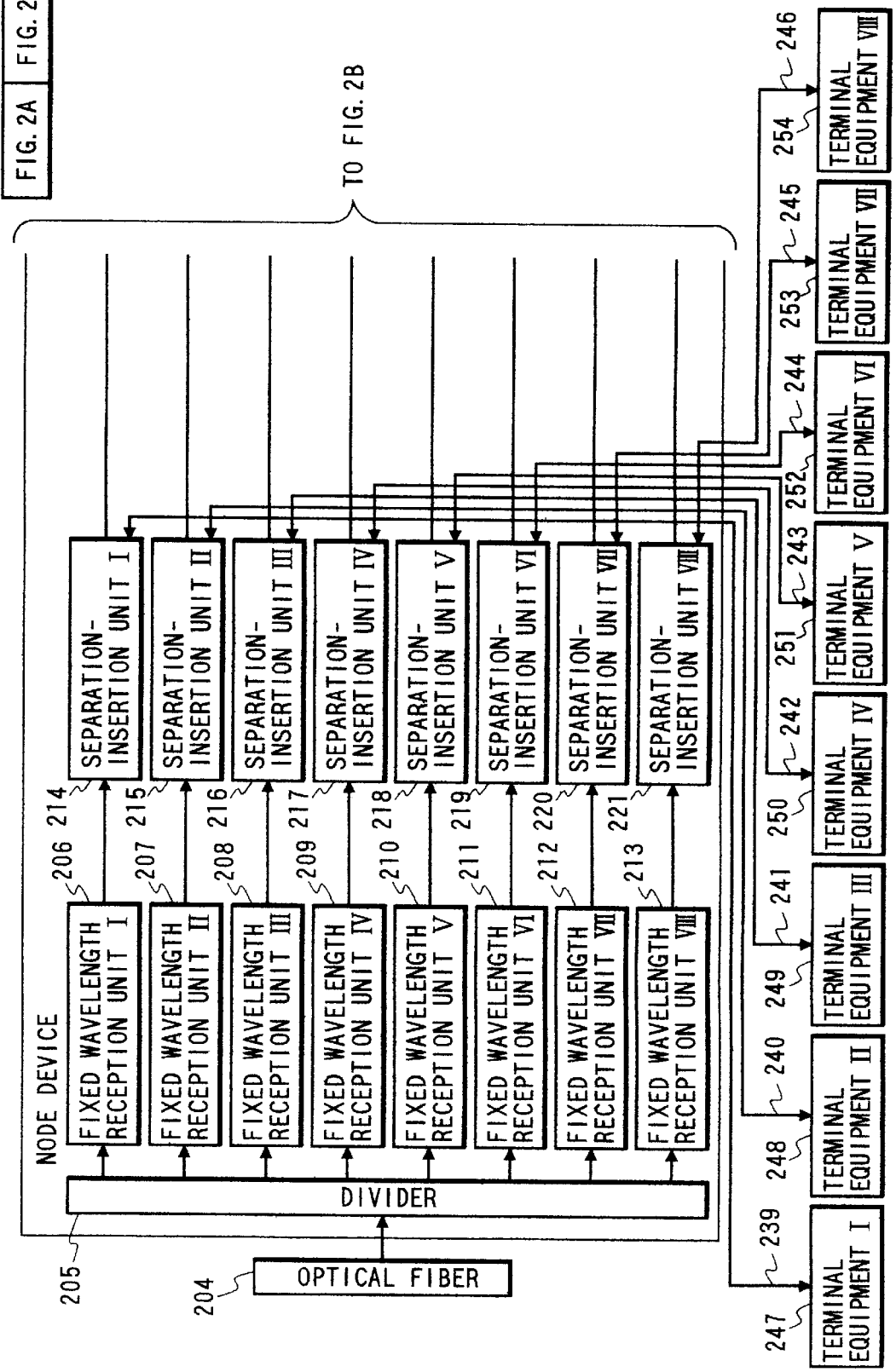

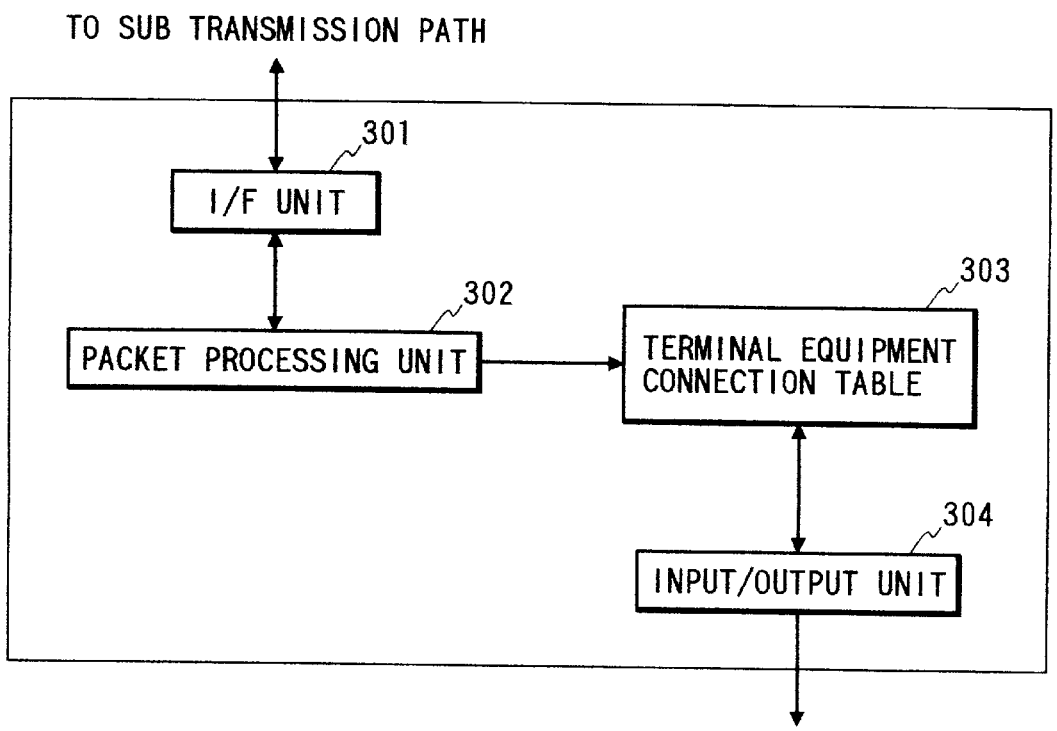
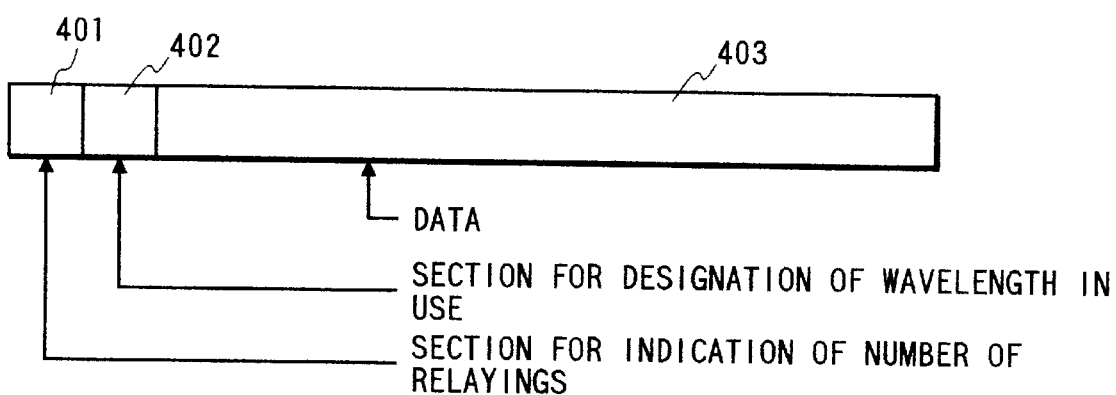

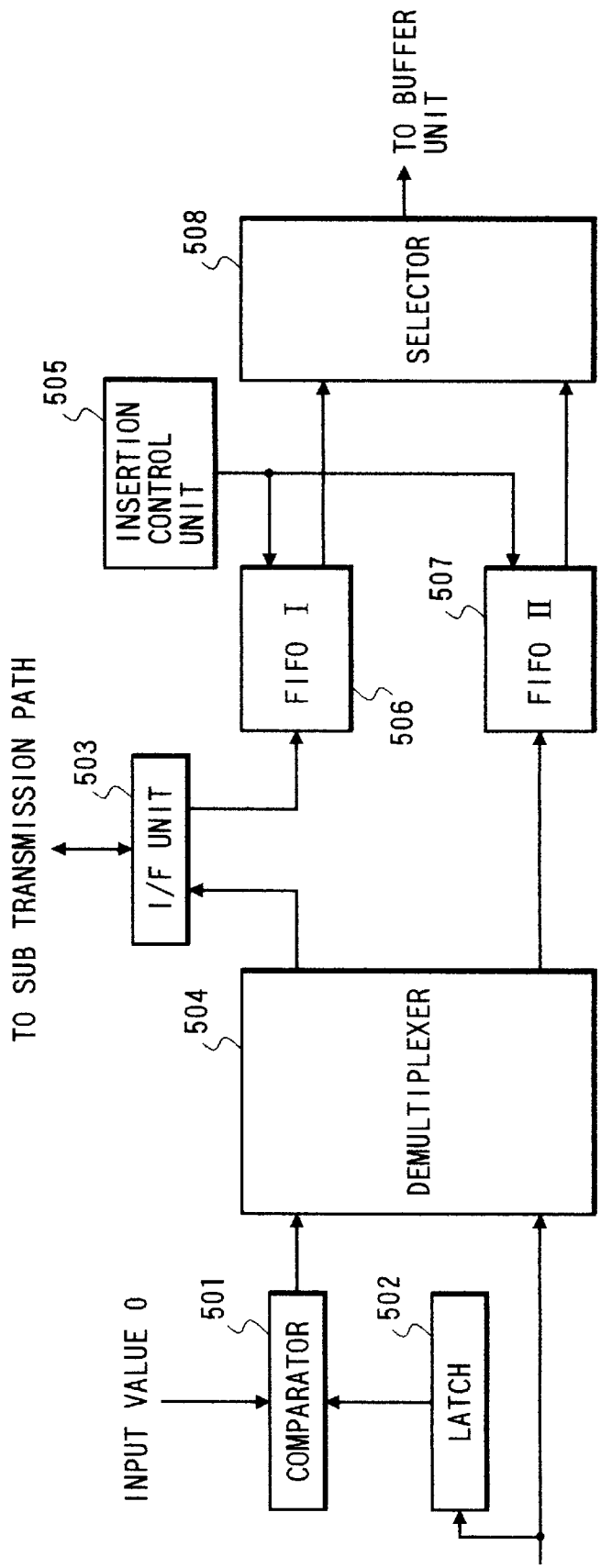

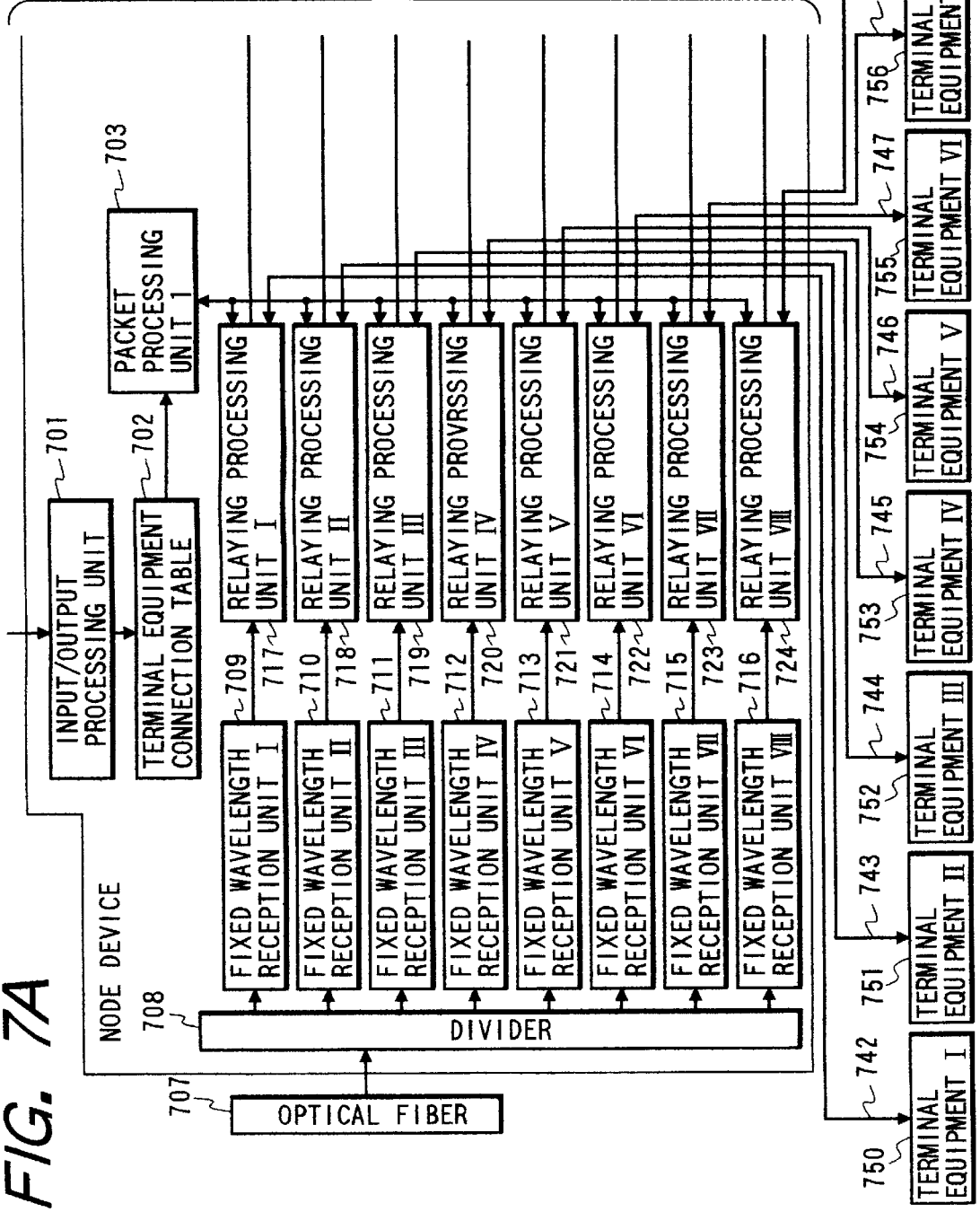

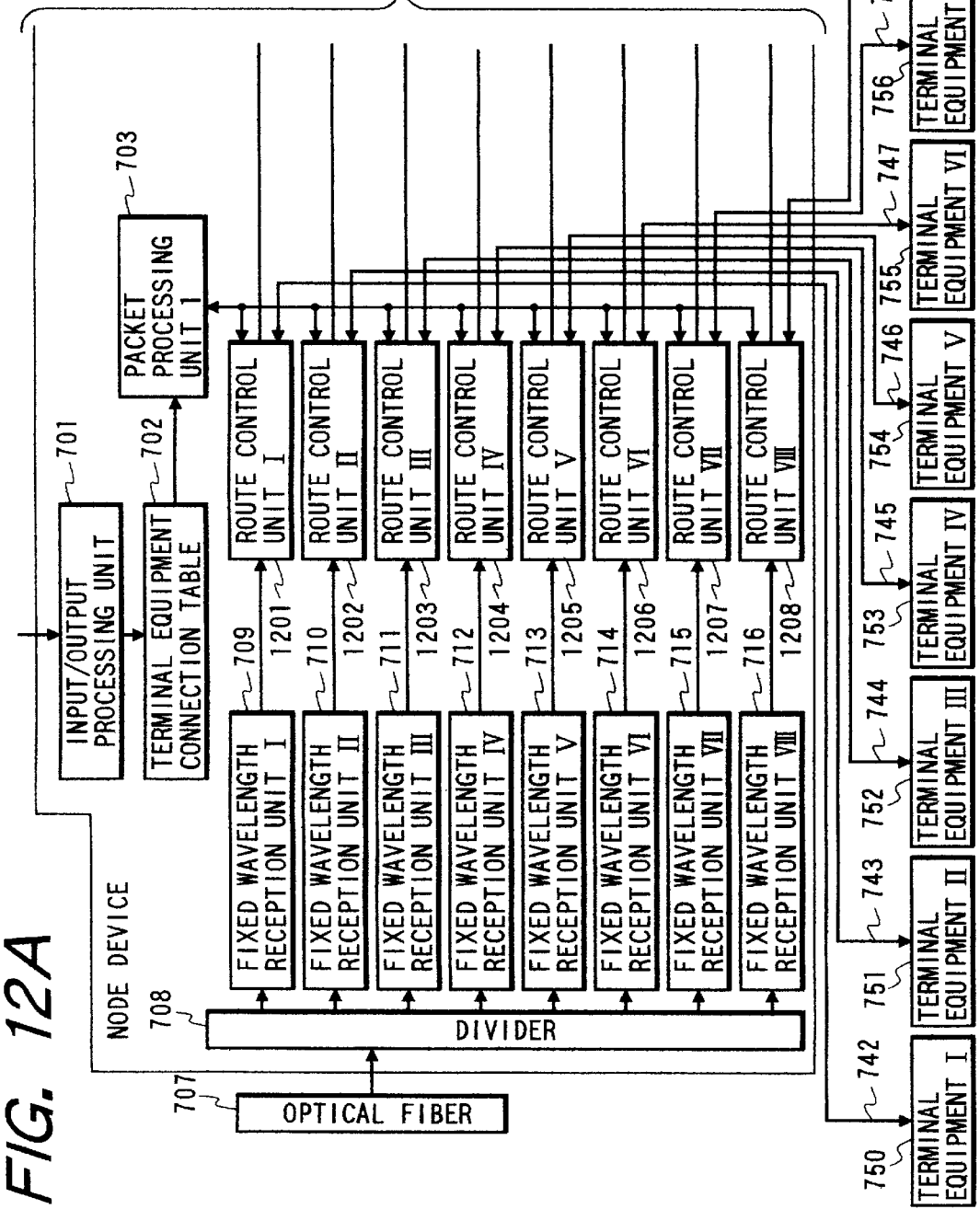

FIG. 14

| FIG. 14A | FIG. 14B |
|---|---|

FIG. 14A

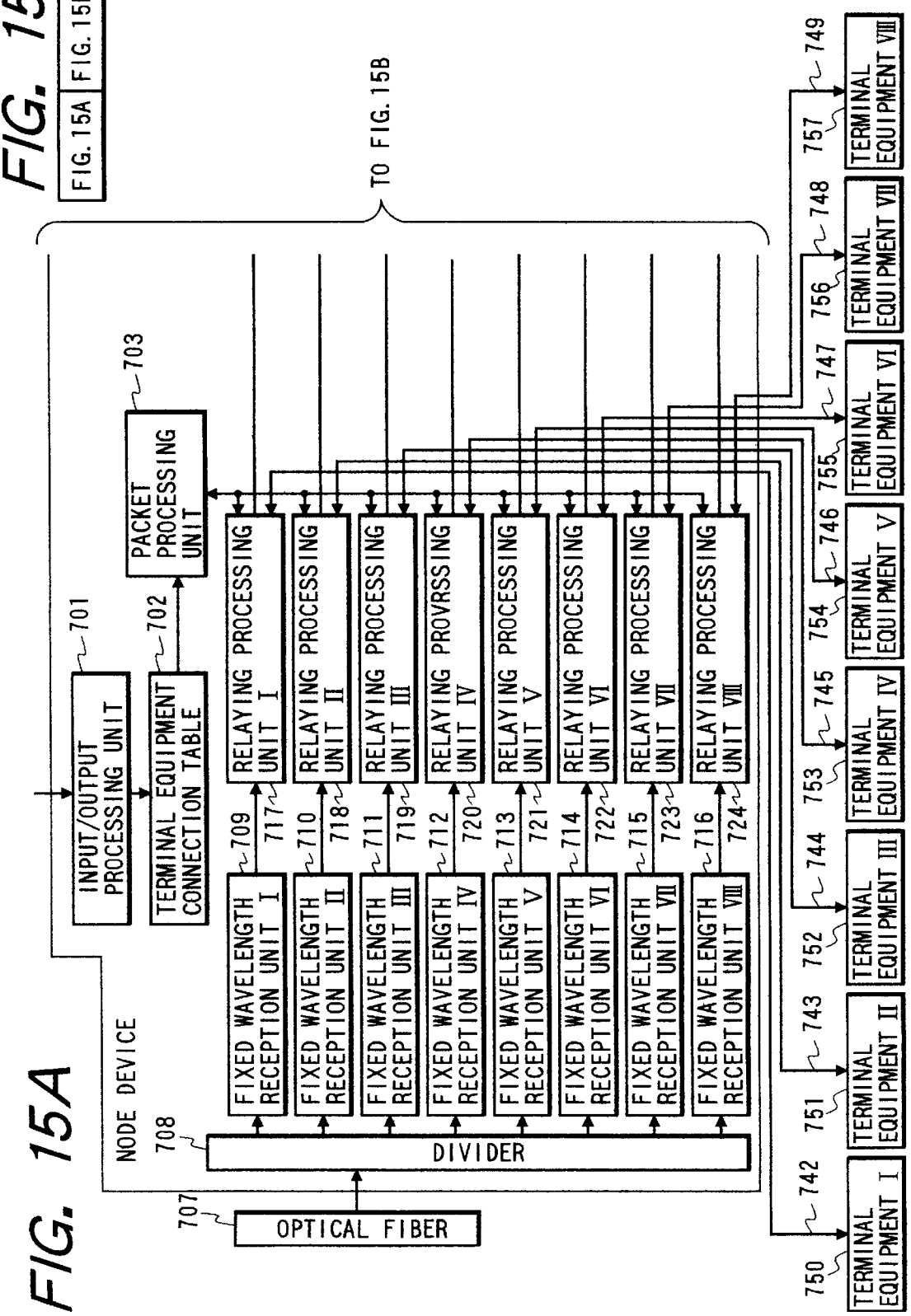

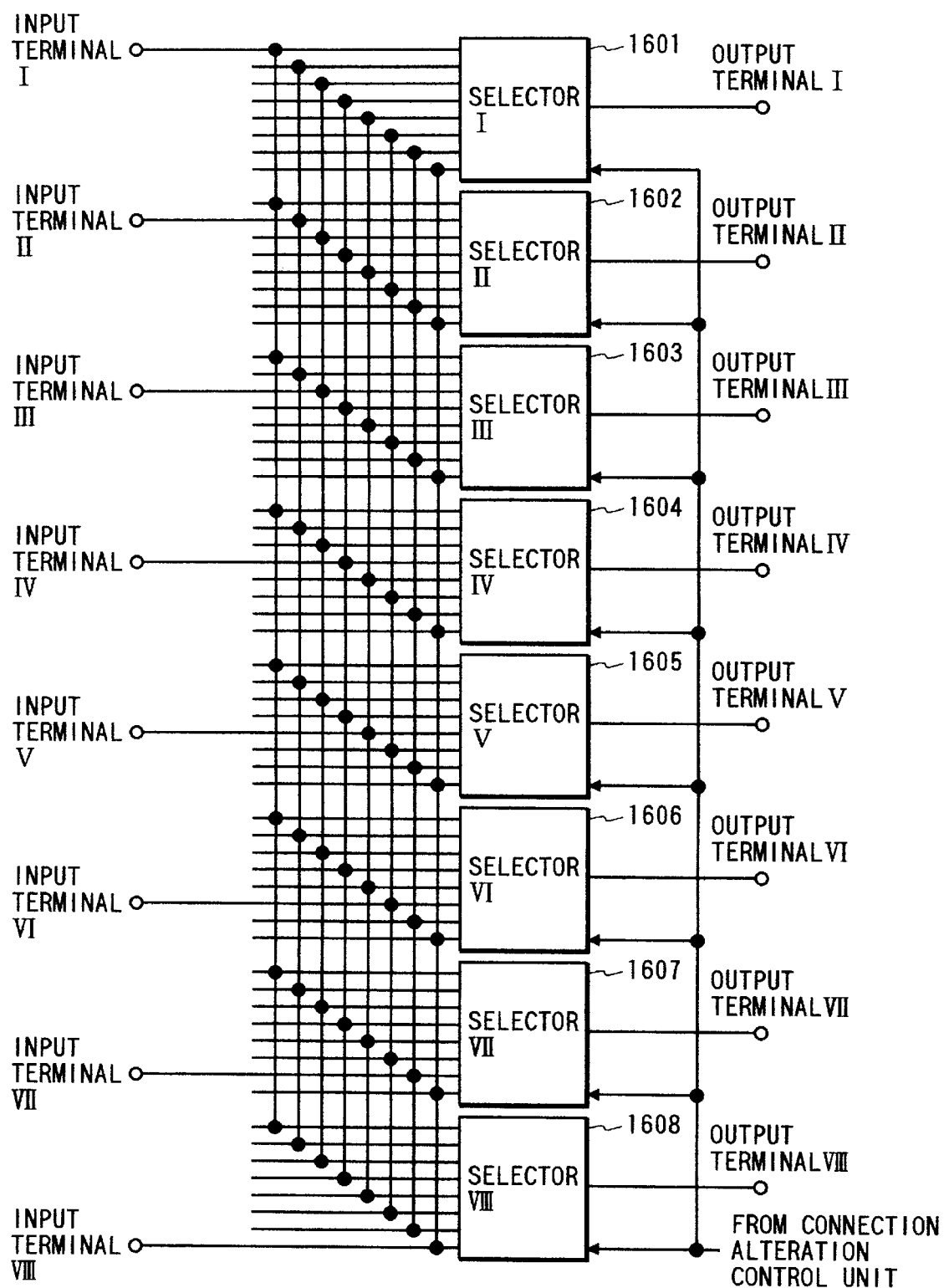

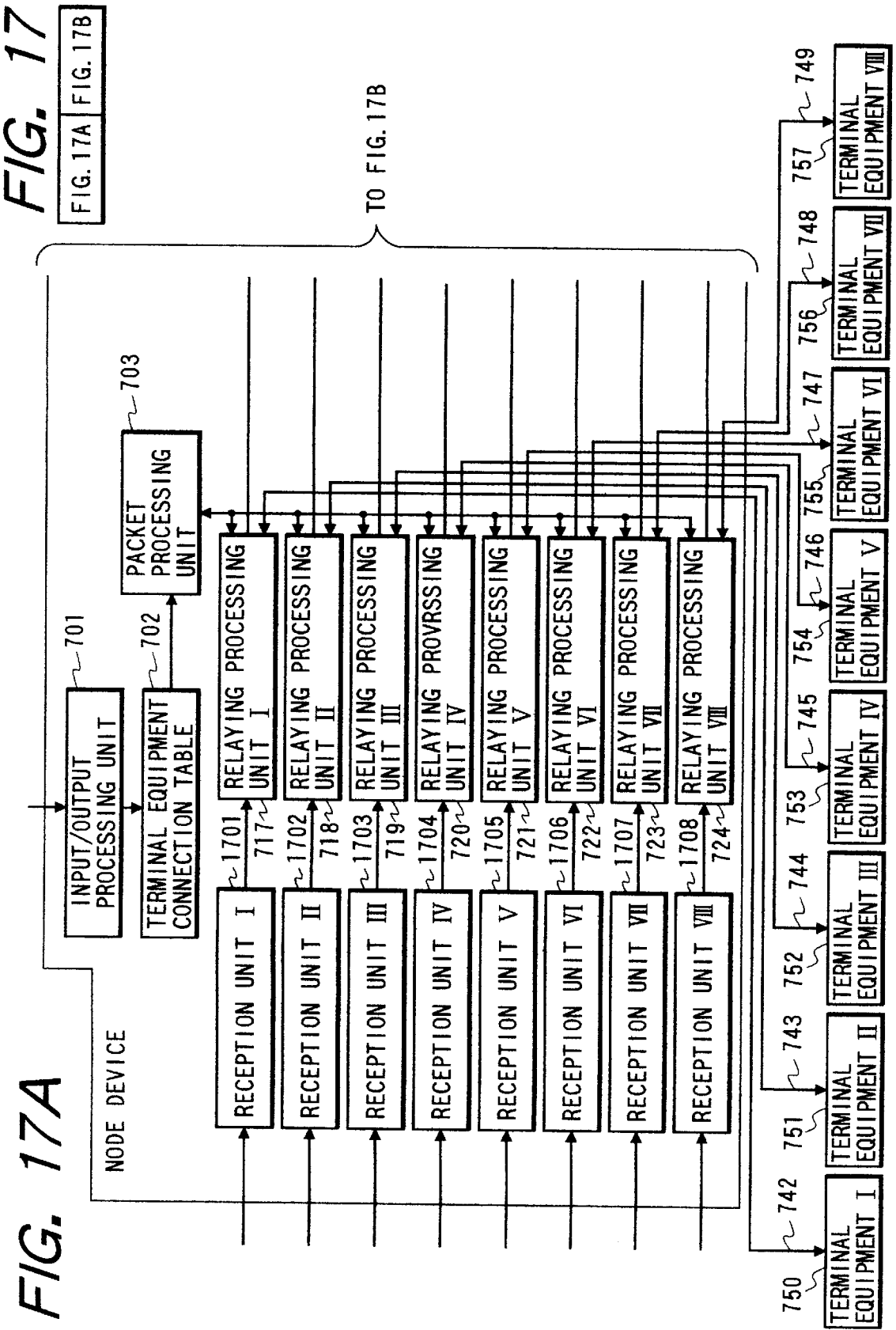

NODE DEVICE USED IN NETWORK SYSTEM FOR PACKET COMMUNICATION, NETWORK SYSTEM USING SUCH NODE DEVICES, AND COMMUNICATION METHOD USED THEREIN

BACKGROUND OF THE INVENTION

1. Field of the Invention

The present invention relates to a network system, a node device used therein, and a communication method also used therein. More particularly, the invention relates to a network system consisting of a plurality of node devices, to each of which one or more terminals or the like are connected, and a transmission line for connecting the node devices by a plurality of channels, a node device used therein, and a communication method used therein.

2. Related Background Art

As the terminals become increasingly faster, a variety of network systems have been researched in order to speed up the network for connecting the terminals; for example, they include those using a light wavelength multiplex transmission line employing a plurality of wavelengths. One of those is a multihop system for relaying and transmitting data to be transmitted through the node device located between an originating terminal (sender terminal) and a destination terminal (receiver terminal). This method is explained by Biswanath Mukherjee in "WDM-Based Local Lightwave Networks Part II: Multihop Systems" IEEE Network July (1992) P 20 to P 32.

SUMMARY OF THE INVENTION

In the multihop network systems known heretofore, the node devices are those for relaying a packet output from a terminal and transmitted to another terminal, and nothing has been known as to a configuration for permitting communication between a node device and a terminal.

An object of the present invention is to realize a network system for permitting communication between a node device and a terminal or permitting communication between node devices.

Before explaining the constitution of the present invention, the configuration described in Japanese Patent Applications No. 6-327496 and No. 7-168237, filed on Dec. 28, 1994 and on Jun. 9, 1995, respectively, in Japan by the inventor of the present invention, will be explained as an example of the multihop network systems. The present specification describes embodiments in which the present invention is applied to this basic configuration.

FIG. 1 shows an example in which four node devices are connected with each other through optical fibers. Numeral 101 to numeral 104 designate node devices shown in FIGS. 2A and 2B, to each of which eight terminals are connected through eight sub-transmission lines. Numeral 105 to numeral 108 denote optical fibers composing a light wavelength multiplex transmission line.

FIGS. 2A and 2B are examples of the structure of the node devices in the above example of the multihop system. In FIGS. 2A and 2B, numeral 201 is a control section for executing control of read-out of buffers and control of transmission wavelengths of variable wavelength transmission units. Numeral 202 denotes a buffer control unit, which controls the operation of reading a packet to be transmitted at a transmission wavelength of variable wavelength transmission unit set by a wavelength control unit out of each buffer. Numeral 203 is the wavelength control unit, which controls the transmission wavelengths of variable wavelength transmission means in accordance with a predetermined transmission wavelength control pattern. Numeral 204 represents an optical fiber for forming the light wavelength multiplex transmission line. Numeral 205 is a divider, which divides a light signal transmitted through the optical fiber 204 into eight signals and outputs them to eight fixed wavelength reception units. Numeral 206 to numeral 213 represent the fixed wavelength reception unit I to fixed wavelength reception unit VIII. Each of the fixed wavelength reception unit I 206 to the fixed wavelength reception unit VIII 213 receives only a packet transmitted as a light signal of one wavelength selected from wavelengths $\lambda 1$ to $\lambda 8$. Numerals 214 to 221 designate separation-insertion unit I to separation-insertion unit VIII, each of which has a function to separate a packet to be transmitted through a sub-transmission line to a terminal out of a packet flow output from the fixed wavelength reception unit 206 to 213 to send it to the terminal and a function to insert a packet received through a sub-transmission line from a terminal into the packet flow output from the fixed wavelength reception unit 206 to 213. Numerals 222 to 229 denote buffer I to buffer VIII, each of which has a function to temporarily store a packet output from the separation-insertion unit 214 to 222. Numerals 230 to 237 stand for the variable wavelength transmission unit I to variable wavelength transmission unit VIII, each of which converts a packet output from the buffer 222 to 229 into a light signal of a predetermined wavelength out of the wavelength $\lambda 1$ to the wavelength $\lambda 8$ under control of the control section 201 to send it through a wavelength multiplexer 238 to the optical fiber 204. Numeral 238 is the wavelength multiplexer, which multiplexes light signals of wavelength $\lambda 1$ to wavelength $\lambda 8$ sent from the eight variable wavelength transmission units 230 to 237 and outputs a composite signal to the optical fiber 204. Numerals 239 to 246 denote sub-transmission line I to sub-transmission line VIII, which function as transmission lines of packet between the separation-insertion units 214 to 221 and the terminals. Numerals 247 to 254 each represent terminal I to terminal VIII connected to the node devices through the sub-transmission line I to the sub-transmission line VIII, each of which receives a packet output from the separation-insertion unit 214 to 221 and each of which makes a packet to be transmitted to another terminal and transmits it through the sub-transmission line 239 to 246 to the separation-insertion unit 214 to 221.

FIG. 3 shows an example of the structure of the terminals. In FIG. 3, reference numeral 301 designates an I/F (Interface) unit, which sends a packet output from a packet processing unit to the sub-transmission line 239 to 246 and which outputs a packet received from the sub-transmission line to the packet processing unit. Numeral 302 represents the packet processing unit, which obtains a value of a relaying number indication section for indication of number of relayings, corresponding to a destination terminal, and a value of a use wavelength designation section for designation of wavelength in use with reference to a terminal connection table, which writes the values thus obtained in predetermined sections in the header to add them to data to be transmitted, thereby building up a packet, and which removes a header portion of a received packet through the I/F unit 301 to execute predetermined reception processing. Numeral 303 is the terminal connection table, which has connection information of terminals about which terminal is connected to which node device or further about what is the wavelength received (hereinafter referred to as reception wavelength) by the fixed wavelength reception unit 206 to 213 for outputting the packet to the separation-insertion unit 214 to 221 to which the terminal is connected through the sub-transmission line 239 to 246, as to the terminals connected to the present network system in the form of the terminal connection table shown in Table 1. Numeral 304 indicates an input/output unit, which has an interface function, such as a keyboard, a display, or the like, for rewriting the contents in the terminal connection table 303 without intervention of the network system when a new terminal is additionally connected to the present network system, when a connection relation between the terminals is modified, and so on.

TABLE 1

| Terminal identification number | Number of relayings | Reception wavelength |
| --- | --- | --- |
| 11 | — | — |
| 12 | 4 | 2 |
| 13 | 4 | 3 |
| 14 | 4 | 4 |
| 15 | 4 | 5 |
| 16 | 4 | 6 |
| 17 | 4 | 7 |
| 18 | 4 | 8 |
| 21 | 1 | 1 |
| 22 | 1 | 2 |
| 23 | 1 | 3 |
| 24 | 1 | 4 |
| 25 | 1 | 5 |
| 26 | 1 | 6 |
| 27 | 1 | 7 |
| 28 | 1 | 8 |
| 31 | 2 | 1 |
| 32 | 2 | 2 |
| 33 | 2 | 3 |
| 34 | 2 | 4 |
| 35 | 2 | 5 |
| 36 | 2 | 6 |
| 37 | 2 | 7 |
| 38 | 2 | 8 |
| 41 | 3 | 1 |
| 42 | 3 | 2 |
| 43 | 3 | 3 |
| 44 | 3 | 4 |
| 45 | 3 | 5 |
| 46 | 3 | 6 |
| 47 | 3 | 7 |
| 48 | 3 | 8 |

FIG. 4 shows an example of the structure of the packet used in the above example of the multihop system. In FIG. 4, reference numeral 401 designates the section for indication of number of relayings (relaying number indication section), which indicates a number of relaying times necessary for transmitting the packet from an originating node device (sender) to a destination node device (receiver). Each relay node device 101 to 104 can determine whether a node device adjacent thereto downstream in the transmission direction is a destination node device or not, referring to this value of the relaying number indication section. Further, each node device can determine whether the node device itself is a destination device or not, referring to this value (for example, depending upon whether it is 0 or not). Numeral 402 represents the section for designation of wavelength in use (use wavelength designation section), which designates a wavelength used upon relaying transmission. The relaying number indication section 401 and use wavelength designation section 402 compose the header portion. The values used for the use wavelength designation section 402 in this header portion are 1 to 8 each assigned to the transmission wavelengths $\lambda 1$ to $\lambda 8$, as shown in Table 2.

Numeral 403 indicates the data portion carried by this packet.

TABLE 2

| Use wavelength of relaying node | Value in use wavelength designation section |
| --- | --- |
| $\lambda 1$ | 1 |
| $\lambda 2$ | 2 |
| $\lambda 3$ | 3 |
| $\lambda 4$ | 4 |
| $\lambda 5$ | 5 |
| $\lambda 6$ | 6 |
| $\lambda 7$ | 7 |
| $\lambda 8$ | 8 |

FIG. 5 is a drawing to show the internal structure of the separation-insertion unit I to the separation-insertion unit VIII in the node device used in the above example of the multihop system. The separation-insertion unit I 214 to the separation-insertion unit VIII 221 are constructed all in the same internal structure. In FIG. 5, reference numeral 501 designates a comparator, which compares the value in the relaying number indication section 401 in the packet output from a latch 502 with 0 and which outputs a separation instruction to a demultiplexer 504 if the value is 0 or outputs a relaying instruction to the demultiplexer 504 if the value is not 0. Numeral 502 is the latch, which stores the relaying number indication section 401 of the packet output from the fixed wavelength reception unit 206 to 213 and outputs the value therein to the comparator 501. Numeral 503 is an I/F unit, which sends the packet output from the demultiplexer 504 to the sub-transmission line 239 to 246 and outputs the packet supplied from the sub-transmission line to FIFO I. Numeral 504 is the demultiplexer, which outputs the input packet to the I/F unit 503 if the output of comparison result from the comparator 501 is the separation instruction, but outputs the packet to FIFO II if it is the relaying instruction. Numeral 505 denotes an insertion control unit, which controls read-out of FIFO I and FIFO II and which instructs a selector 508 as to which FIFO is to be selected, thereby performing control for inserting the packet transmitted through the sub-transmission line 239 to 246 into the packet flow output from the fixed wavelength reception unit 206 to 213. Numeral 506 and numeral 507 represent FIFO I and FIFO II, respectively, which temporarily store the packet input thereto and which output the packet in the input sequence to the selector 508 under control of the insertion control unit 505. Numeral 508 is the selector, which selects either FIFO storing the packet signal to be output, according to the instruction from the insertion control unit 505.

FIG. 6 is a drawing to show the internal structure of the buffer I to buffer VIII used in the above example of the multihop system. The buffer I to buffer VIII are constructed all in the same internal structure. In FIG. 6, reference numeral 601 designates a demultiplexer, which outputs the use wavelength designation section 402 in the header portion of the packet output from the separation-insertion unit 214 to 221 to a latch I 602, the relaying number indication section 401 to a latch II 603, and the data portion 403 to a shift register 605, respectively. Numeral 602 denotes the latch I, which stores the use wavelength indication section 402 in the header portion of packet and outputs the value therein to a writing address counter 606 and to a selector 607. Numeral 603 is the latch II, which stores the relaying number indication section 401 in the header portion of packet and outputs the value thereof to a down counter 604. Numeral 604 is the down counter, which decreases the relaying number indication section 401 in the header portion of the packet output from the latch II 603 and outputs the result to the selector 607. Numeral 605 is the shift register, which gives a desired delay to the data portion 403 in the packet output from the demultiplexer 601 and outputs the result to the selector 607. Numeral 606 is the writing address counter, which generates writing addresses in a dual port memory 609 in which the packet is to be written in accordance with the value of the use wavelength designation section 402 in the header portion of the packet output from the latch I 602 and which outputs address signals where the packet is sequentially written, to the dual port memory 609. Numeral 607 is the selector, which sequentially selects the value of the relaying number indication section 401 decreased by the down counter 604 and the data portion 403 in the packet with the desired delay output from the shift register 605, thereby reconstructing a packet having a value resulting from the decreasing operation as a new value of the relaying number indication section 401, and outputs the result to the dual port memory 609. Numeral 608 is a reading address counter, which outputs address signals sequentially to read out a packet to the dual port memory 609 with an offset value output from the buffer control unit 202 in the control section 201 as a reading start address. Numeral 609 is the dual port memory for permitting writing and reading of packet data independently of each other. A memory region of the dual port memory 609 is divided into eight regions, according to the wavelengths for sending of packet. Memory region I to memory region VIII correspond to the transmission wavelengths $\lambda 1$ to $\lambda 8$, respectively. Head addresses of the respective regions are A1, A2, A3, A4, A5, A6, A7, and A8.

In the above example of the multihop system, the packet processing unit 302 in the terminal for transmitting the data obtains the value of the relaying number indication section 401, corresponding to the destination terminal, and the value of use wavelength designation section 402 with reference to the terminal connection table 303, writes these in the predetermined sections of the header to add them to the data to be transmitted, thereby building up a packet, and transmits the packet through the sub-transmission line 239 to 246 to the separation-insertion unit 214 to 221 in the node device.

The packet sent from the sender terminal is inserted into one of the packet flows output from the fixed wavelength reception unit 206 to 213 in one of the separation-insertion units 214 to 221, the value of the relaying number indication section 401 is decreased in one of the buffer units 222 to 229, and the result is temporarily stored in the memory region corresponding to the wavelength designated in the use wavelength designation section 402. After that, it is sent as a light signal of the predetermined wavelength out of one of the variable wavelength transmission units 230 to 237 and is received by one of the fixed wavelength reception units 206 to 213 corresponding to the aforementioned wavelength in the node device located downstream. Then one of the separation-insertion units 214 to 221 to which said packet is inputted determines whether the value of the relaying number indication section 401 is "0" or not. If the value is not "0" then the value is output to the buffer, and the buffer decreases the value of relaying number indication section 401 and then again transmits the result to a further downstream node device. Repeating this relaying operation, when the value of the relaying number indication section 401 reaches "0", the packet is separated and transmitted to one of the sub-transmission lines 239 to 246 and is subjected to reception processing in the packet processing unit 302 of the terminal.

In this relaying operation, the packet is converted into a light signal of the wavelength received by either one of the fixed wavelength reception units 206 to 213 outputting the packet to the separation-insertion unit 214 to 221 to which the destination terminal is connected through the sub-transmission line 239 to 246, based on the value of the use wavelength designation section 402, and the light signal is transmitted thereto.

In this example of the multihop system, the sender terminal searches the terminal connection table to set the values of the use wavelength designation section and relaying number indication section corresponding to the receiver terminal, whereby the relaying processing in the node device is carried out based on these two values and the packet is transmitted to the desired terminal. Therefore, the multihop system can perform higher-speed relaying processing than in the case of transmission as designating an identification number of destination terminal as a destination terminal. However, it had the following problems because the terminals performing transmission of packet needed to have the terminal connection table.

Namely, when a new network system is constructed, when the configuration thereof is changed, or when a new terminal is added to the network system, it is necessary to execute processing including preparation, renewal, or the like of a new terminal connection table for the all terminals on the network system. However, if the scale of the network system is large with a lot of terminals, loads for these processing are great, which was a problem. Further, in order for the destination terminal to receive the packet transmitted from each terminal without an error, management is necessary so that there are no errors in the contents of the terminal connection tablets owned by the individual terminals. However, if the scale of the network system is large with a lot of terminals, the loads for this management are great, which was also a problem.

Therefore, the present invention provides a network system, a node device for network system, and a communication method therefor accomplished in view of the problems of the system in the above example of the multihop system or the like.

Specifically, the present invention provides a configuration for performing communication between a node device and a terminal or between node devices.

The present invention has been accomplished in view of the problems of the system in the above example of the multihop system or the like, and an object of the present invention is to provide a network system of improved wavelength multiplexing or the like, and a node device and a communication method therefor, which can decrease the loads concerning the processing including the preparation, renewal, or the like of new terminal connection table, for example in the case of the large-scale network systems with many terminals, when a new network system is constructed, when the configuration is changed, or when a new terminal is added to the network system, and which can decrease the loads of management or the like of the contents of the terminal connection tables, which is necessary for a receiver terminal to receive the packet transmitted from each terminal without errors.

Specifically, the node device is arranged to perform communication between the node device and terminals, and the node device is provided with connection information of each terminal such as the terminal connection table, and a terminal desiring to know connection information of other terminals obtains the information through communication with the node device.

For that, the present invention involves the node devices constructed in the following fashion.

1. A node device used in a network system for communication using a packet, which is comprised of a transmission line and a plurality of node devices for connecting sub-transmission lines to said transmission line, comprising:

packet processing means for processing a packet;

first means for outputting a packet supplied thereto from said transmission line to said sub-transmission line side or to said transmission line side;

second means for outputting a packet transmitted through said sub-transmission line to said transmission line side or to said packet processing means side; and third means for outputting a packet supplied thereto from said packet processing means to said sub-transmission line side.

2. The below embodiments show arrangements in which a terminal is connected to said sub-transmission line. The terminal stated herein may be one selected from those of various structures.

3. In the above arrangement, said packet processing means processes a packet having been transmitted from said terminal through said sub-transmission line or a packet to be transmitted through said sub-transmission line to said terminal, whereby transmission of information can be effected between said terminal and said node device.

4. In the above arrangement, if said node device further stores connection information of each terminal in said network system, said packet processing means, when receiving a packet of an inquiry about connection information of another terminal transmitted from said terminal, can process said inquiry with reference to said connection information of each terminal.

5. Further, in the above arrangement, said first means is one for outputting a packet supplied thereto from said transmission line to said sub-transmission line side, to said transmission line side, or to said packet processing means side, and said third means may be arranged to output a packet supplied thereto from said packet processing means to said sub-transmission line side or to said transmission line side.

6. In this case, said packet processing means processes a packet having been transmitted from another node device through said transmission line or a packet to be transmitted through said transmission line to another node device, whereby transmission of information can be effected between said node devices.

7. If the device is arranged in such a manner that each of said first, second, and third means determines a side for outputting said packet in accordance with information of a predetermined section in a packet supplied thereto, the first, second, and third means needs to make reference to only a part of the packet, which is preferred.

8. In the below-described embodiments, a relaying processing unit or a route control unit serves as said first, second, and third means.

9. In the above each arrangement, said transmission line may be one having a plurality of channels numbering n, and in that case, said first means may be one for outputting a packet input into said node device in a predetermined channel out of said plurality of channels to said sub-transmission line side or to said transmission line side.

10. In the arrangement of above 9, when the node device transmits and receives the plurality of n channels, said node device has n said first and second means corresponding to said plurality of channels numbering n.

11. As an arrangement at that time, if said node device has n memory means, corresponding to said n first and second means, each memory means temporarily storing a packet output from said each first and second means, and transmission means for transmitting outputs from said n memory means in n said channels different from each other, the packet output from each first and second means to the transmission line can be transmitted without interference on each channel.

12. On that occasion, if said transmission means can switch the channels for transmitting the outputs from said respective n memory means, the packet output from each first and second means to the transmission line can be output in a desired channel.

13. On that occasion, if switching of said transmission channels is carried out according to a predetermined pattern, arbitration control also becomes unnecessary.

14. In the arrangement of above 5, when said transmission line has a plurality of channels numbering n, said first means may be one for outputting a packet input into said node device in a predetermined channel out of said plurality of channels to said sub-transmission line side, to said transmission line side, or to said packet processing means side.

15. In the arrangement of above 14, when the node device transmits and receives the plurality of n channels, said node device has n said first, second, and third means corresponding to said plurality of channels numbering n.

16. If an arrangement on that occasion is such that said node device has n memory means, corresponding to said n first, second, and third means, each memory means temporarily storing a packet output from said each first, second, and third means, and transmission means for transmitting outputs from said n memory means in n said channels different from each other, the packet output from each first, second, and third means to the transmission line can be transmitted without interference on each channel.

Further, the present application also discloses the network systems having the node devices of the above each arrangement.

The communication method of the present invention comprises the following communication methods.

1. A communication method in a network system for communication using a packet, which is comprised of a transmission line and a plurality of node devices for connecting terminals to said transmission line, comprising a step of:

arranging each said node device to have packet processing means for processing a packet, processing by said packet processing means a packet having been transmitted from said terminal or a packet to be transmitted to said terminal, thereby effecting transmission of information between said terminal and said node device.

2. In the above communication method, if said node device stores connection information of each terminal in said network system, connection information of another terminal can be transmitted as the information for transmission between said terminal and said node device.

3. In the above communication method, before transmitting a packet to another terminal, said terminal transmits an inquiry packet for inquiring connection information of a destination terminal to said packet processing means, and said packet processing means makes reference to said connection information in accordance with said inquiry, and transmits an answer packet in which said connection information of the destination terminal obtained thereby is described, to the terminal having sent said inquiry packet, whereby the terminal connection information of the destination terminal can be obtained without a need for the terminal itself to store the information.

4. The connection information comprises information indicating to which node device each terminal is connected.

5. Further specifically, said information indicating to which node device each terminal is connected is information indicating a number of relaying times by the node devices before a packet transmitted to each terminal reaches a node device to which the each terminal is connected.

6. In that arrangement, a terminal receiving said answer packet adds the information indicating the number of relaying times to the packet transmitted to said destination terminal and transmits said packet, and the node devices for relaying said packet process the information indicating the number of relaying times in said packet so that said information indicating the number of relaying times in the packet can be information indicating a number of relaying times effected after itself, whereby the relaying control in each relaying node device can be simplified.

7. Further, if said transmission line has a plurality of channels, said connection information preferably comprises information of the channels to which the terminals are connected.

8. In that structure, if said node device can select a channel for outputting a packet to be output to said transmission line, the terminal receiving said answer packet adds information indicating the channel to which said destination terminal is connected ,to said packet transmitted to said destination terminal and transmits said packet, and a node device right before the node device to which the destination terminal is connected transmits said packet in the channel to which the destination terminal of said packet is connected, which enables relaying control with good efficiency.

9. In the above each arrangement, if said node device is arranged to select whether a packet transmitted from a terminal is to be output to said transmission line side or to said packet processing means side, communication between terminals and communication between terminal and node device can be selectively carried out.

10. In the above each arrangement, transmission of information between node devices can be effected by processing in said packet processing means a packet having been transmitted from another node device or a packet to be transmitted to another node device.

11. On that occasion, selection is made in said node device as to whether the packet having been transmitted from another node device is to be output to said transmission line side, to said packet processing means side, or to said terminal side, whereby communication between terminals, communication between terminal and node device, and communication between node devices can be selectively carried out.

12. For example, if the connection information of each terminal in the network system is transmitted as the information for transmission between the node devices, the connection information of each terminal stored in one node device can be transmitted to the other node devices, which facilitates preparation of new connection information (terminal connection table) of the terminals and communication thereof.

BRIEF DESCRIPTION OF THE DRAWINGS

FIG. 3 is a drawing to show a structural example of the terminal in the system example of FIG. 1;

FIG. 4 is a drawing to show a structural example of the packet of the node device used in the system example of FIG. 1;

FIG. 5 is a drawing to show a structural example of the separation-insertion unit in the node device used in the system example of FIG. 1;

FIG. 16 is a drawing to show the structure of a connection alteration unit in the fifth embodiment according to the present invention.

DETAILED DESCRIPTION OF THE PREFERRED EMBODIMENTS

Embodiment 1

Figure 2B:
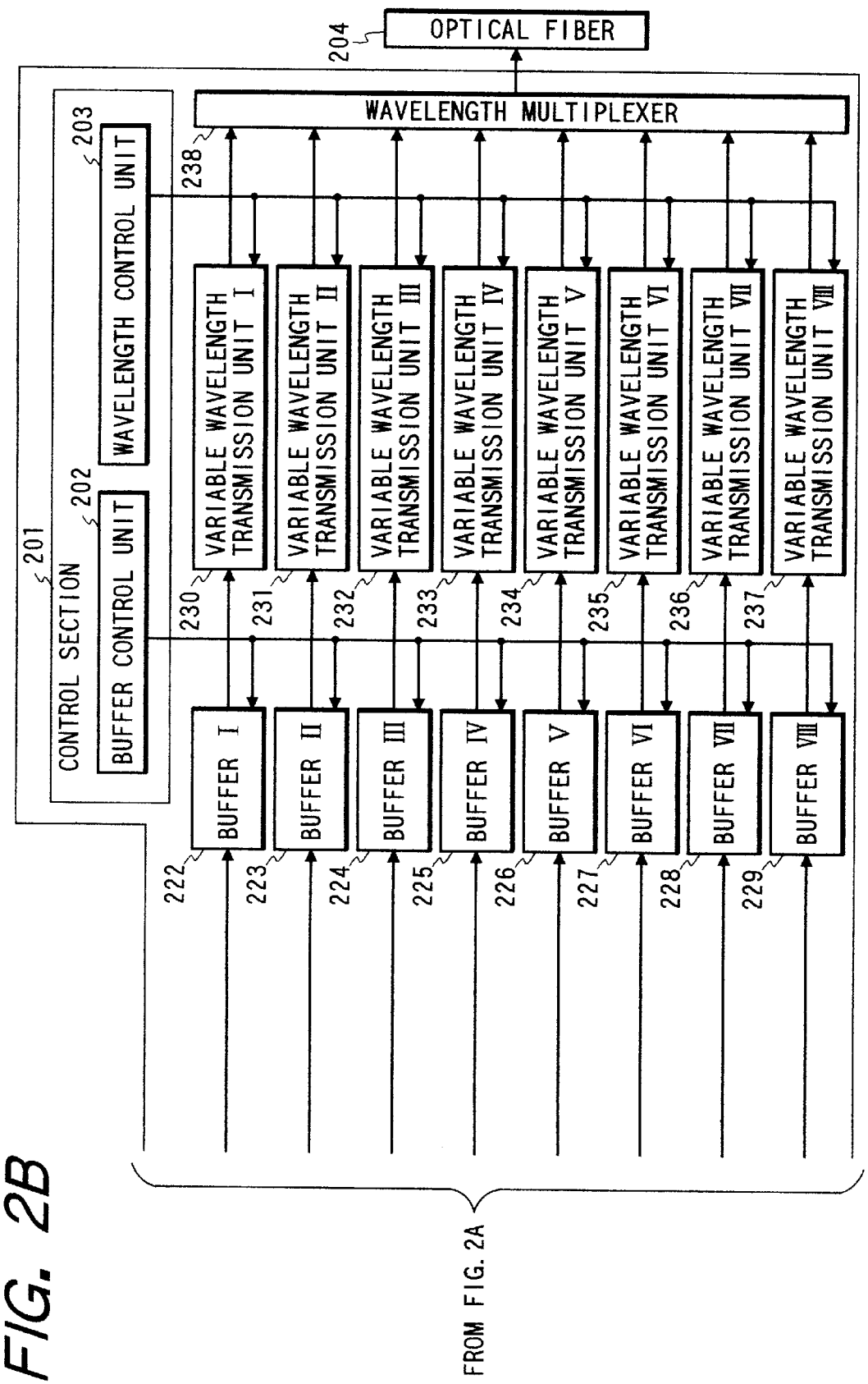
FIG. 2 which is comprised of FIGS. 2A and 2B is a drawing to show the structure of the node device in the system example of FIG. 1.
Figure 7B:
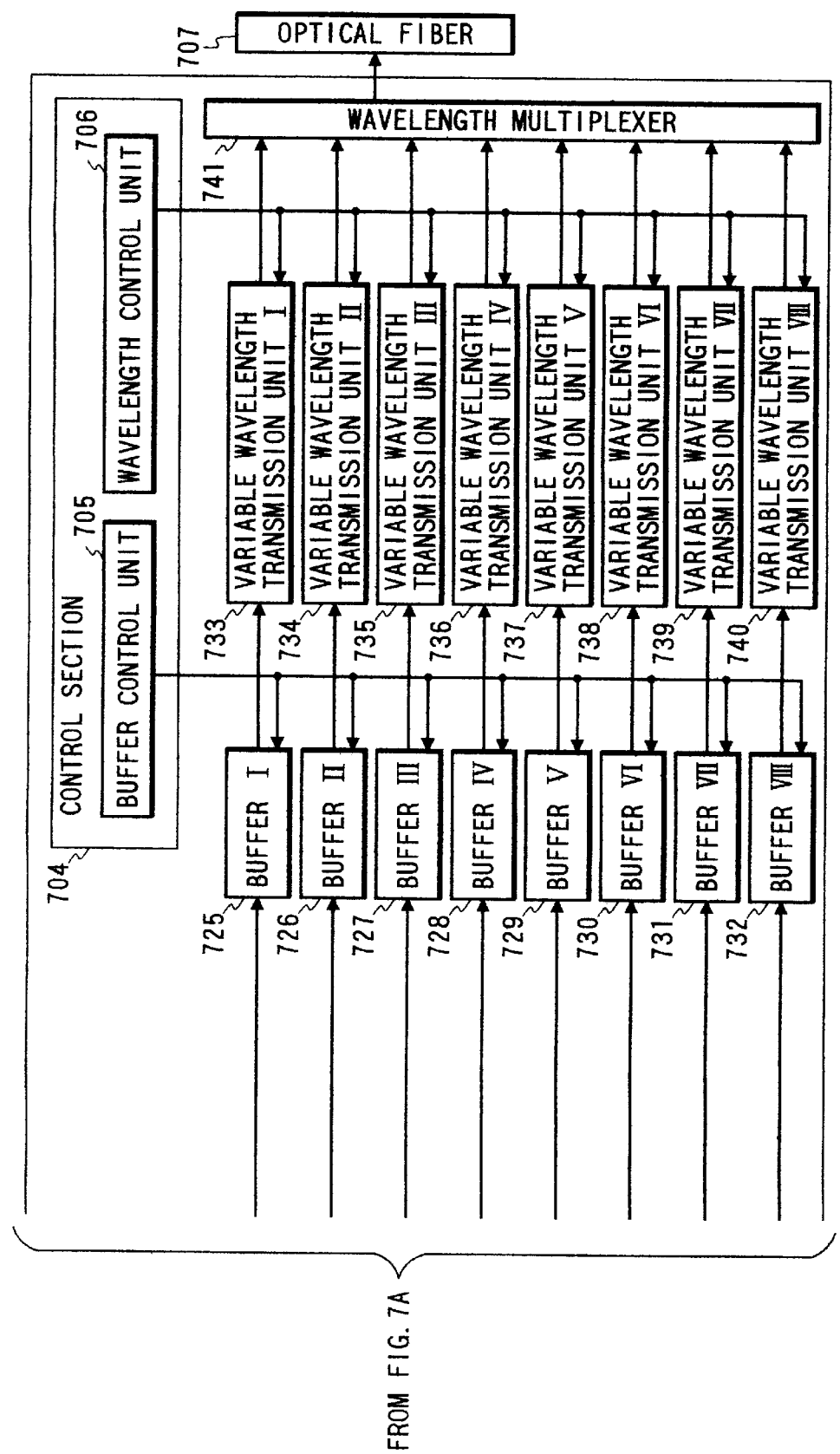
FIG. 7 which comprised of FIGS. 7A and 7B is a drawing to show the structure of the node device in the first embodiment according to the present invention.

FIGS. 7A and 7B show the first embodiment of the node device according to the present invention, which is used in the wavelength multiplex network system using the eight wavelengths of from the wavelength $\lambda 1$ to the wavelength $\lambda 8$. The structure of this node device is the same as that of the node device in the aforementioned system example of FIGS. 2A and 2B except that relaying processing unit I 717 to relaying processing unit VIII 724 are provided in place of the separation-insertion unit I to the separation-insertion unit VIII and that an input/output processing unit 701, a terminal connection table 702, and a packet processing unit I 703 are added to the device.

In FIGS. 7A and 7B, numeral 701 designates the input/output processing unit, which has an interface function unit such as a keyboard, a display, or the like for rewriting the contents in the terminal connection table when a new terminal is additionally connected to the present network system, when the connection relation of terminals is changed, or the like. Numeral 702 denotes the terminal connection table, which has the connection information of terminals about the terminals connected to the instant network system, for example, as to which terminal is connected to a node device requiring how many relaying times from a sender terminal, or as to what is the wavelength received (hereinafter referred to as reception wavelength) by the fixed wavelength reception unit for outputting the packet to the relaying processing unit to which the terminal is connected through the sub-transmission line, in the form of the terminal connection table as shown in Table 1. Table 1 is an example of the terminal connection table of the node device I 101 in the aforementioned multihop system example shown in FIG. 1. Each terminal identification number represents the node device in connection by the number of tens and the reception wavelength by the number of units. The relaying number section indicates a number of relayings up to the destination terminal including relaying in the originating node device. Numeral 703 is the packet processing unit I, which receives an inquiry packet output from the relaying processing unit I 717 to the relaying processing unit VIII 724, which searches the terminal connection table using the identification number of the destination terminal of the data portion in the inquiry packet to read values indicating the number of relayings up to the destination terminal and the reception wavelength, which is the wavelength of a light signal used upon transmission, and which assembles an answer packet using the data of the values and outputs it to the relaying processing unit corresponding to the sub-transmission line to which the originating terminal of the inquiry packet is connected. As values for designating the wavelength of the light signal used upon transmission, "1" to "8" are assigned to the wavelength $\lambda 1$ to the wavelength $\lambda 8$ in use as shown in Table 2. Further, the value "0" is assigned for a value other than the values assigned in order to designate the wavelengths of light signals used upon transmission.

Figure 8:
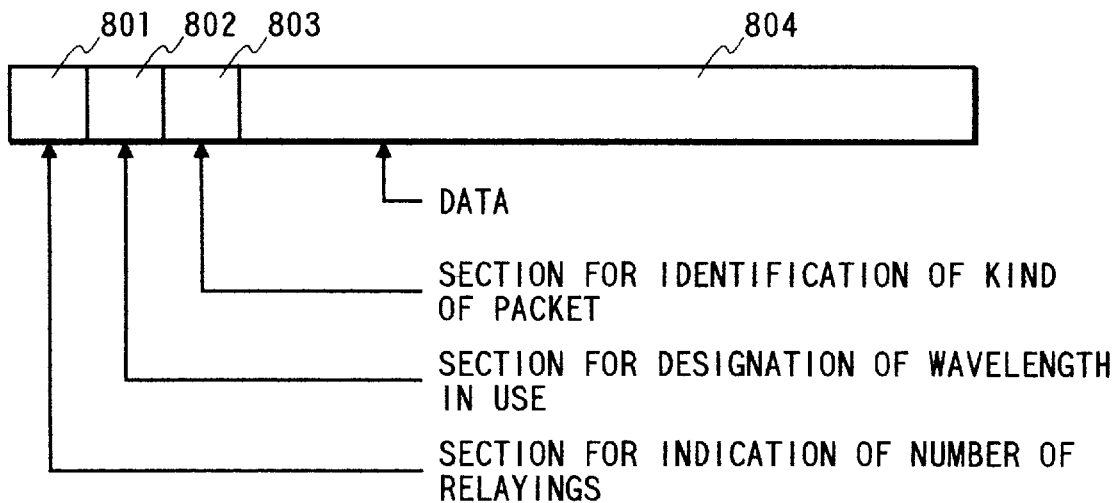
FIG. 8 is a drawing to show a structural example of the packet used in the present invention.

FIG. 8 is a structural example of the packet suitably applicable in the optical communication method of the first embodiment of the present invention. In FIG. 8, numeral 801 is the relaying number indication section for indicating a number of relayings necessary for transmitting the packet from the originating node device to the destination node device. Each node device under relaying decreases the value of the relaying number indication section 801 and compares the resultant with "1", whereby it can know whether a node device adjacent thereto downstream in the transmission direction is the destination node device or not. Further, each device can know whether the node device itself is the destination or not by checking whether this value is "0" or not. Numeral 802 is the use wavelength designation section, which designates the wavelength used upon relaying transmission. The relaying number indication section 801 and use wavelength designation section 802 compose the header portion. The values used for the use wavelength designation section 802 in this header portion are the aforementioned values shown in Table 2. Numeral 803 represents a packet kind identification section for indicating a kind of packet, i.e., whether the packet is an inquiry packet or an answer packet. Numeral 804 denotes the data portion carried by this packet. In the inquiry packet, an identification number of the originating terminal and an identification number of the destination terminal are written in the data section.

Figure 9:
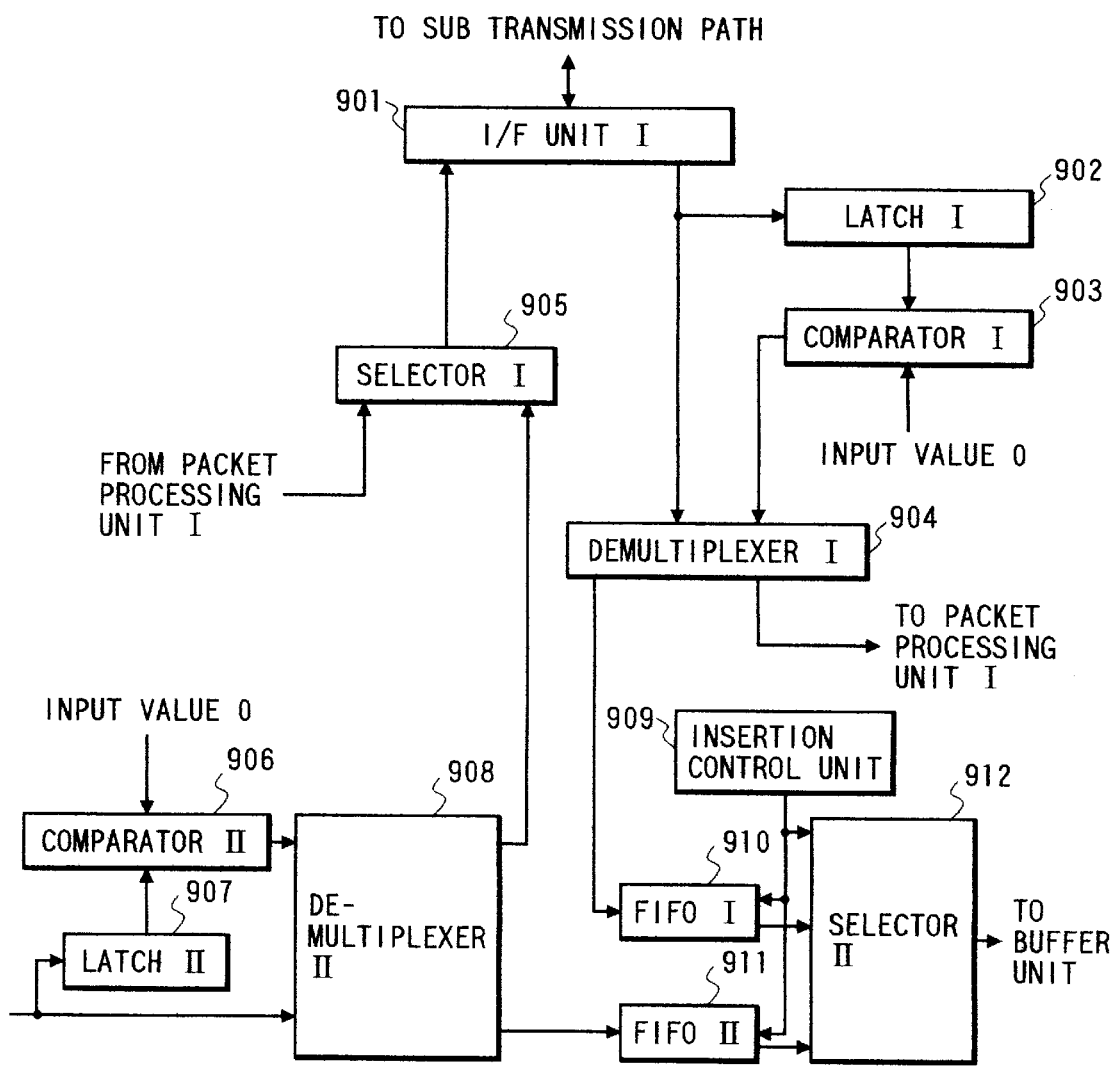
FIG. 9 is a drawing to show the structure of a relaying processing unit in the first embodiment according to the present invention.

FIG. 9 shows a structural example of the relaying processing unit I 717 to the relaying processing unit VIII 724 suitably applied in the first embodiment of the node device according to the present invention. The relaying processing unit I 717 to the relaying processing unit VIII 724 are constructed in the same internal structure.

In FIG. 9, numeral 901 designates an I/F unit I, which sends a packet output from a selector 905 to the sub-transmission line and which outputs a packet supplied through the sub-transmission line to a latch I 902 and to a demultiplexer 904. Numeral 902 is the latch I, which stores the use wavelength designation section 802 of the packet output from the I/F unit I 901 and outputs the value thereof to a comparator I 903. Numeral 903 is the comparator I 903, which compares the value of the use wavelength designation section 802 of the packet output from the latch I 902 with 0 and which outputs a separation instruction to a demultiplexer I 904 if it is 0 or outputs an insertion instruction to the demultiplexer I 904 if it is not 0. Here, the value "0" is a value other than the values assigned in order to designate the wavelengths of light signals used upon transmission, as described previously. Numeral 904 is the demultiplexer I, which outputs the packet to the packet processing unit I 703 if the output of comparison result of the input packet in the comparator 903 is the separation instruction but outputs the packet to FIFO I 910 if the output is the relaying instruction. Numeral 905 is the selector I, which sets an input source of a packet to be output to the I/F unit I 901 to the packet output from the packet processing unit I 703 at the end of the packet flow output from a demultiplexer II 908, thereby inserting the packet output from the packet processing unit I 703 into the packet flow output from the demultiplexer II 908 and outputting the resultant to the I/F unit I 901. Numeral 906 designates the comparator II, which compares the value of the relaying number indication section of the packet output from a latch II 907 with 0 and which outputs the separation instruction to the demultiplexer II 908 if it is 0 or outputs the relaying instruction to the demultiplexer II 908 if it is not 0. Numeral 907 is the latch II, which stores the relaying number indication section 801 of the packet output from the fixed wavelength reception unit and outputs the value to the comparator II 906. Numeral 908 designates the demultiplexer II, which outputs the input packet to the selector I 905 if the output of comparison result from the comparator II 906 is the separation instruction or which outputs the packet to FIFO II 911 if the output is the relaying instruction. Numeral 909 is the insertion control unit, which controls reading-out of FIFO I 910 and FIFO II 911 and which instructs the selector II 912 about which FIFO is to be selected, thereby performing such control as to insert the packet transmitted through the sub-transmission line into the packet flow output from the fixed wavelength reception unit. Numeral 910 and numeral 911 each represent the FIFOs (First In First Out), which temporarily store an input packet and output the packet in the input sequence to the selector II 912 under control of the insertion control unit 909. Numeral 912 is the selector II, which selects either FIFO storing the packet signal to be output and outputs it to the buffer unit, under an instruction from the insertion control unit 909.

Figure 6:
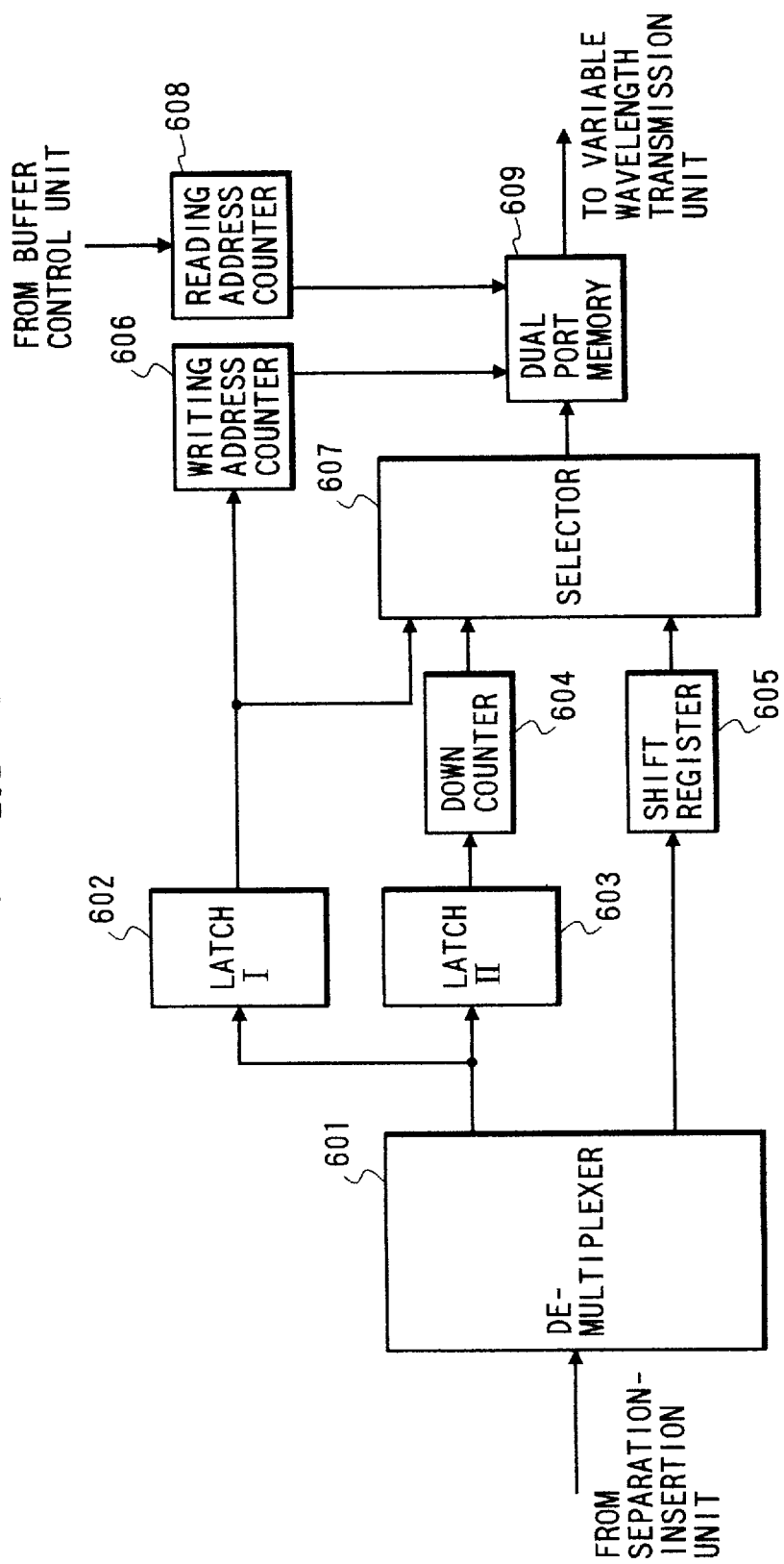
FIG. 6 is a drawing to show a structural example of the buffer in the node device used in the system examples of FIG. 1.
Figure 10:
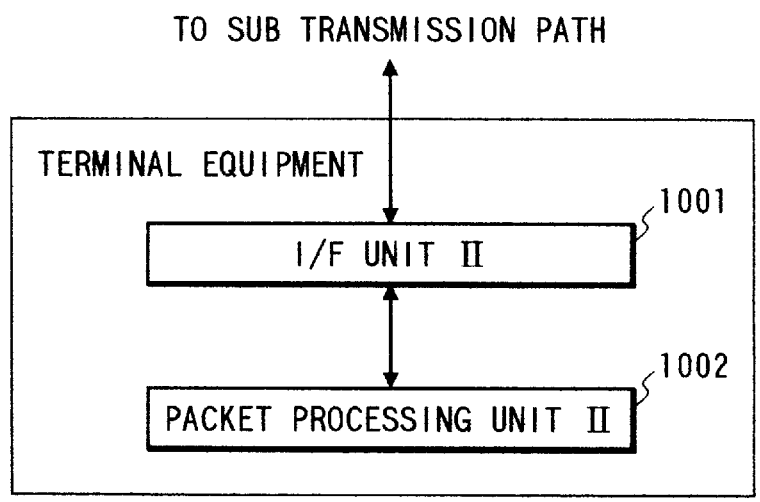
FIG. 10 is a drawing to show a structural example of the terminal used in the present invention.

FIG. 10 shows a structural example of the terminal. In FIG. 10, reference numeral 1001 designates an I/F unit II, which sends a packet output from a packet processing unit II 1002 to the sub-transmission line and outputs a packet input through the sub-transmission line to the packet processing unit II 1002. Numeral 1002 is the packet processing unit II, which executes such operation for transmitting data to another terminal as to first write the value "0" in the use wavelength designation section 802, designate the packet kind identification section 803 as an "inquiry packet", assemble an inquiry packet with data of the identification number of the originating terminal and the identification number of the destination terminal, and output the inquiry packet to the I/F unit II 1001. After that, when an answer packet from the node device is received, the packet processing unit II 1002 makes a header using the value of the relaying number indication section 801 corresponding to the destination terminal notified of by the answer packet and the value of the use wavelength designation section 802, assembles a packet as adding this header to the data to be transmitted, and outputs the packet to the I/F unit II 1001, thus performing the transmission processing. Further, the packet processing unit II 1002 performs predetermined reception processing by removing the header portion of a reception packet input through the I/F unit II 1001. The structure of buffer I 725 to buffer VIII 732 is the same as the structure of FIG. 6.

Figure 1:
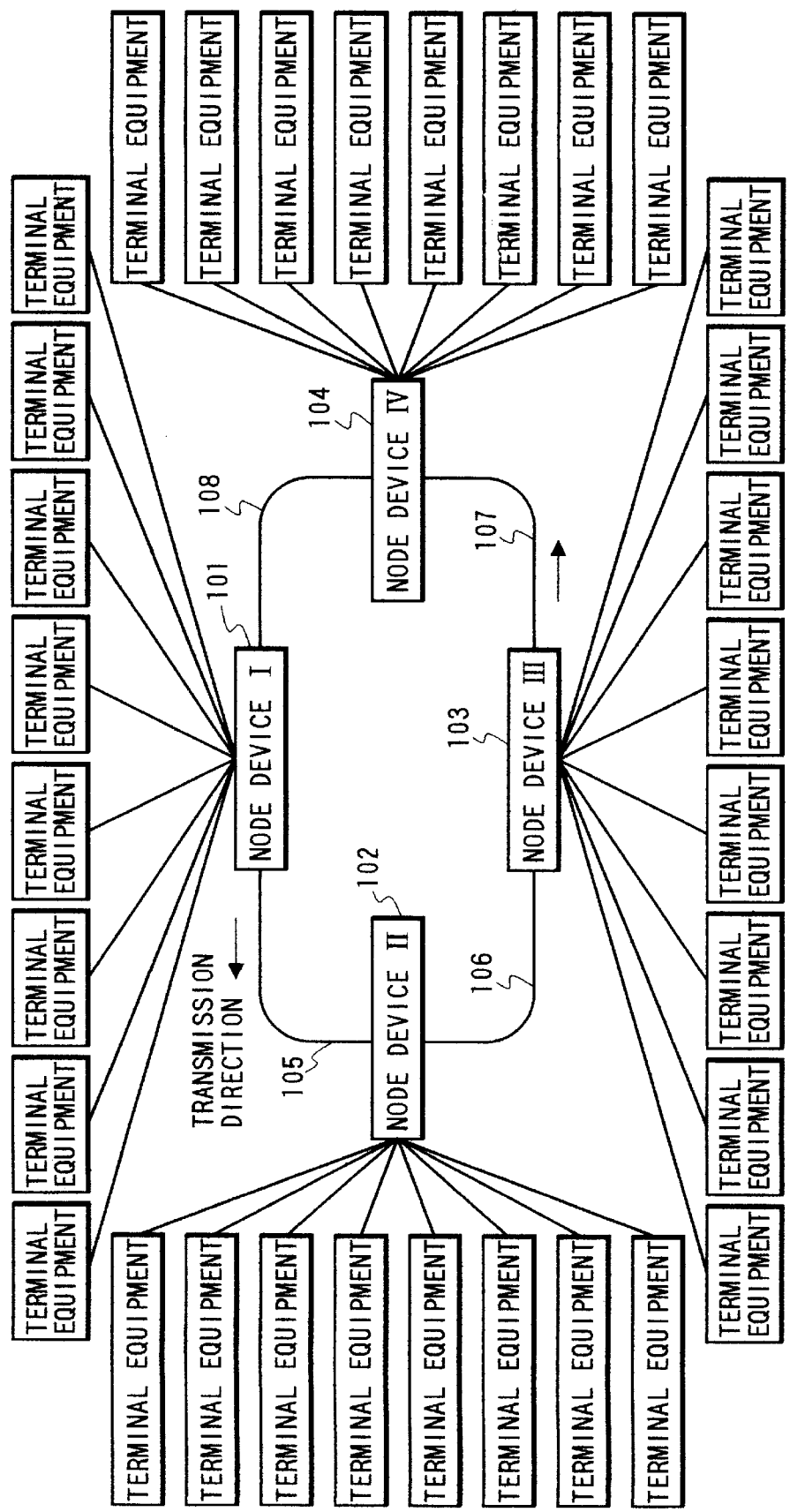
FIG. 1 is a drawing to show an example of the multihop network system.

The operation of the first embodiment of the present invention will be explained with an example in which data is transmitted from the terminal I 750 connected to the sub-transmission line I 742 of the node device I 101 to the terminal V 754 connected to the sub-transmission line V 746 of the node device IV 104 as a destination in the aforementioned multihop system example shown in FIG. 1, referring to FIGS. 7A and 7B, FIG. 8, FIG. 9, FIG. 10, and FIG. 6. In the following description same constituent elements of different and node devices will be denoted by the same reference numerals as those shown in FIGS. 7A and 7B, FIG. 9, FIG. 10, and FIG. 6 for convenience' sake.

Prior to transmission of data, the originating terminal I 750 about to transmit data to the terminal V 754 sends an inquiry packet to the node device I 101 to inquire a number of relaying times and a value of use wavelength necessary upon transmission of data to the destination terminal. For that purpose, the packet processing unit II 1002 in the terminal I 750 writes the value "0" in the use wavelength designation section 802, designates the packet kind identification section 803 as an "inquiry packet", assembles the inquiry packet using data of the identification number "11" of the sender terminal and the identification number "45" of the terminal V 754 connected to the sub-transmission line V 746 of the node device IV 104 as a destination terminal, and outputs the inquiry packet through the I/F unit II 1001 to the sub-transmission line I 742. The inquiry packet output to the sub-transmission line is input into the I/F unit I 901 of the relaying processing unit I 717 connected to the sub-transmission line I 742 of the node device I 101.

The I/F unit I 901 of the relaying processing unit I 717 of the node device I 101 outputs the value of the use wavelength designation section 802 in the header portion of the inquiry packet transmitted through the sub-transmission line I 742 to the latch I 902. The latch I 902 retains this value and outputs it to the comparator I 903. The comparator I 903 compares this value with "0". Since the value of the use wavelength designation section 802 in the inquiry packet was set to be "0", the comparator I 903 outputs the separation instruction to the demultiplexer I 904. The inquiry packet is input into the demultiplexer I 904 from the I/F unit I 901, and it outputs the inquiry packet input thereto to the packet processing unit I 703 in accordance with the separation instruction from the comparator I 903.

The packet processing unit I 703 receives the inquiry packet output from the demultiplexer II 904 of the relaying processing unit I 717, searches the terminal connection table using the identification number "45" of the destination terminal of the data portion in the inquiry packet, reads out the values indicating the number of relaying times up to the destination terminal and the reception wavelength, which is the wavelength of a light signal used upon transmission, writes information indicative of said number of relaying times and said reception wavelength into the data portion of the packet, designates the packet kind identification section 803 as an answer packet, and assembles the answer packet. As shown in previous Table 1, the value of relaying number read out at this time is "3", which is the value indicating three relayings at the home node device I 101, at the node device II 102, and at the node device III 103. Further, the value indicating the wavelength of the light signal used upon transmission is "5", which is the value indicating the light signal of the wavelength λ5 received by the fixed wavelength reception unit V 713 for outputting the packet to the relaying processing unit V 721 to which the sub-transmission line V 746 of the destination of the node device IV 104 is connected. At the same time, the packet processing unit I 703 reads the identification number "11" of the sender terminal I 750 of the inquiry packet out of the identification number of the home terminal written in the data portion of the inquiry packet, and finds out that the relaying processing unit I 717 is the relaying processing unit to which the sender terminal of the inquiry packet is connected, from the value "1" indicating the reception wavelength with reference to the terminal connection table, and outputs the answer packet to the relaying processing unit I 717.

The answer packet directed to the terminal I 750, output from the packet processing unit I 703 of the node device I 101, is input into the selector I 905 of the relaying processing unit I 717. Subsequently, the answer packet input into the selector I 905 is output to the I/F unit I 901 at the end of the packet output from the demultiplexer II 908 and is then supplied through the sub-transmission line I 742 into the I/F unit II 1001 of the terminal I 750 then to enter the packet processing unit II 1002. Receiving the answer packet, the packet processing unit II 1002 makes a header, using the value "3" of the relaying number indication section 801 corresponding to the terminal V 754 connected to the node device IV 104 as a destination terminal, notified of by the answer packet, and the value "5" of the use wavelength designation section 802, and it sets the packet kind identification section 803 in the data packet. Then the packet processing unit II 1002 assembles the data packet as adding it to the data to be transmitted, and outputs the data packet to the I/F unit II 1001. The I/F unit II 1001 transfers the data packet through the sub-transmission line 742, to the relaying processing unit I 717 of the node device I 101.

The I/F unit I 901 of the relaying processing unit I 717 in the node device I 101 writes the use wavelength designation section 802 in the header portion of the data packet transferred through the sub-transmission line I 742, in the latch I 902. The comparator I 903 compares the value "5" of the use wavelength section 802 in the data packet stored in the latch I 902 with the input value "0" for comparison, and it outputs the insertion instruction to the demultiplexer I 904, because they do not agree. Receiving this insertion instruction, the demultiplexer I 904 sequentially writes the data packet output from the I/F unit I 901 into the FIFO I 910. After completion of writing of the data packet into the FIFO I 910, the insertion control unit 909 finds out the end of the packet flow read out from the FIFO II 911, switches the input of FIFO to be output from the selector II 912 into the input from the FIFO I 910, stops reading of FIFO II 911, and starts reading of FIFO I 910. Then, after completion of the reading of the data packet written in the FIFO I 910, the insertion control unit 909 switches the input of FIFO which the selector II 912 is to output, again to the input of the FIFO II 911, stops the reading of FIFO I 910, and restarts reading of FIFO II 911. The data packet output from the selector II 912 is guided into the buffer I 725.

The demultiplexer 601 of the buffer I 725 outputs the use wavelength designation section 802 of the header portion in the data packet output from the relaying processing unit I 717 to the latch I 602, the relaying number indication section 801 to the latch II 603, and the data portion 804 to the shift register 605. The latch I 602 stores the use wavelength designation section 802 of the header portion of the data packet and outputs the value to the writing address counter 606 and to the selector 607. The latch II 603 stores the relaying number indication section 801 of the header portion of the data packet and. outputs the value to the down counter 604. The down counter 604 decreases the value of the relaying number indication section 801 in the header portion of the data packet output from the latch II 603 and outputs the result to the selector 607. The shift register 605 gives a desired delay to the data portion 804 of the data packet output from the demultiplexer 601 and outputs it to the selector 607. The selector 607 sequentially selects the use wavelength designation section 802 in the header portion of the data packet output from the latch I 602, the value of the relaying number indication section 801 resulting from the decreasing operation by the down counter 604, and the data portion 804 of the data packet with the desired delay output from the shift register 605, so as to reconstruct the data packet as decreasing the value of the relaying number indication section 801, and then outputs it to the dual port memory 609. Here, the packet kind identification section 803 is handled together with the data 804. On the other hand, the writing address counter 606 assigns A5 as a writing start address of the dual port memory 609 for the data packet to be written, in accordance with the value "5" of the use wavelength designation section 802 in the header portion of the data packet output from the latch I 602 and outputs the address signals for the packet to be sequentially written to the dual port memory 609. The data packet reconstructed through the selector 607 is input into the input port of the dual port memory 609 and is sequentially written into the memory region V in accordance with the addresses output from the writing address counter 606.

After the data packet is written into the memory region V in this manner and when the transmission wavelength of the variable wavelength transmission unit I 733 is set to $\lambda 5$ under the control of the wavelength control unit 706 in the control section 704, the buffer control unit 705 in the control section 704 outputs the offset value A5 corresponding to the memory region V to the reading address counter 608 of the buffer I 725. Based on this offset value A5, the reading address counter 608 successively gives an increment to the counter value, so as to generate addresses for reading the data packet written in the memory region V and then output the addresses to the dual port memory 609. According to the reading addresses, the data packet is sequentially read out from the output port of the dual port memory 609 to be output to the variable wavelength transmission unit I 733. Since the transmission wavelength of the variable wavelength transmission unit I 733 is set at $\lambda 5$, the data packet is sent as a light signal of the wavelength $\lambda 5$ out of the variable wavelength transmission unit I 733 to the wavelength multiplexer 741, and it is multiplexed in the wavelength multiplexer 741 with light signals of the wavelengths different from each other, sent from the other variable wavelength transmission unit II 734 to variable wavelength transmission unit VIII 740, to be output to the optical fiber 707 and to be transferred to the node device II 102 adjacent on the downstream side.

In the present embodiment the channels (the wavelengths in this case) capable of outputting the packets from the respective buffers I–VIII are switched by switching the output channels of the transmission units corresponding to the respective buffers. Particularly, this example is arranged so as to switch the output channels of the respective transmission units in accordance with a pattern set so that the outputs from the respective buffers are output in the channels different from each other. The present embodiment obviates arbitration control of outputs from the respective buffers by such control as to read the packets to be output in the respective channels out of the buffers in agreement with the output channels of the respective transmission units. When the wavelength variable light source is used as in the present embodiment, preferred examples of the pattern for switching the wavelengths include a pattern in which the shortest wavelength is first selected in the arrangement of the wavelengths in use from the shortest, then the odd wavelengths are successively selected in the ascending order, the highest even wavelength is selected after selection of the highest odd wavelength, then the even wavelengths are successively selected in the descending order, and, after selection of the second shortest wavelength, the shortest wavelength is again selected; and a pattern in which the second shortest wavelength is first selected, then the even wavelengths are successively selected in the ascending order, the maximum odd wavelength is selected after selection of the highest even wavelength, then the odd wavelengths are successively selected in the descending order, and, after selection of the shortest wavelength, the second shortest wavelength is again selected. It is because use of the patterns described above can minimize an amount of transition of wavelength upon switching of wavelength. For example, preferred patterns for selecting the wavelengths of $\lambda 1$ to $\lambda 8$ with $\lambda 1$ being the shortest include a pattern with each cycle of $\lambda 1$, $\lambda 3$, $\lambda 5$, $\lambda 7$, $\lambda 8$, $\lambda 6$, $\lambda 4$, and $\lambda 2$ and a pattern with each cycle of $\lambda 2$, $\lambda 4$, $\lambda 6$, $\lambda 8$, $\lambda 7$, $\lambda 5$, $\lambda 3$, and $\lambda 1$. The present embodiment uses such patterns as shifting then so that the channels output from the respective transmission units at a certain point are different from each other.

The data packet, transmitted as the light signal of the wavelength $\lambda 5$ to the node device II 102, then is subjected to relaying transmission processing in the node device II 102. The light signals of the wavelengths $\lambda 1$ to $\lambda 8$ transmitted through the optical fiber 105 from the node device I 101 are divided by the divider 708 of the node device II 102 to enter the fixed wavelength reception unit I 709 to the fixed wavelength reception unit VIII 716.

The data packet sent as the light signal of the wavelength $\lambda 5$ out of the node device I 101 is received by the fixed wavelength reception unit V 713 for receiving only the light signal of the wavelength $\lambda 5$. The data packet received by the fixed wavelength reception unit V 713 is output to the relaying processing unit V 721.

Written in the latch II 907 of the relaying processing unit V 721 is the relaying number indication section 801 of the data packet output from the fixed wavelength reception unit V 713, and the value is output to the comparator II 906. Since the value of the relaying number indication section 801 in the data packet output from the latch II 907 is "2", the comparator II 906 outputs the relaying instruction to the demultiplexer II 908. Receiving the relaying instruction from the comparator II 906, the demultiplexer II 908 outputs the input data packet to the FIFO II 911. The data packet written in the FIFO II 911 in this manner is read out under the control of the insertion control unit 909 and is output through the selector II 912 to the buffer V 729. In the same manner as in the buffer I 725 of the node device I 101, the down counter 604 decreases the value of the relaying number indication section 801 in the data packet input into the buffer V 729 to "1" and the packet is reconstructed to be written into the memory region V of the dual port memory 609. After that, the packet is sent out as a light signal of the wavelength λ5 in the same manner as in the node device I 101, and is transferred to the node device III 103 adjacent on the downstream side. The data packet transferred as the light signal of the wavelength λ5 into the node device III 103 is subjected to the relaying transmission processing in the same manner as in the node device II 102, and is transmitted as the light signal of the wavelength λ5 to the node device IV 104. At this time, the value of the relaying number indication section is decreased to "0".

The data packet transmitted as the light signal of the wavelength λ5 to the node device IV 104 is received by the fixed wavelength reception unit V 713 of the node device IV 104 to be output to the relaying processing unit V 721.

The latch II 907 of the relaying processing unit V 721 stores the relaying number indication section 801 of the data packet output from the fixed wavelength reception unit V 713 and the value is output to the comparator II 906. Since the value of the relaying number indication section 801 in the data packet output from the latch II 907 is "0", the comparator II 906 outputs the separation instruction to the demultiplexer II 908. Receiving the separation instruction from the comparator II 906, the demultiplexer II 908 outputs the input data packet to the selector I 905. The selector I 905 multiplexes the data packet with the packet output from the packet processing unit I 703 and outputs the resultant to the I/F unit I 901. By this, the data packet is output to the I/F unit I 901, then is transmitted through the sub-transmission line V 746, and thereafter is received by the terminal V 754 being the destination. Then the header portion of the packet is removed, and thereafter the desired processing is carried out as extracting only the data portion 804.

The data packet, transmitted in this manner from the terminal I 750 connected to the sub-transmission line I 742 of the sender node device I 101 to the terminal V 754 connected to the sub-transmission line V 746 of the node device IV 104, is transmitted as the light signal of the wavelength λ5 from the variable wavelength transmission unit I 733 of the node device I 101. After that, the value of the relaying number indication section 801 is decreased in the node device II 102 and in the node device III 103, and, after relayed by the light signal of the wavelength λ5, the relaying processing unit V 721 of the node device IV 104 detects that the value of the relaying number indication section 801 is "0". After separated and transmitted to the sub-transmission line V 746, the data packet is received by the terminal V 754. The present embodiment is arranged to use the wavelength designated in the use wavelength designation section in the all midway relaying node devices, but a minimum requirement in actual is that only the one-preceding node device to the node device to which the destination terminal is connected outputs the packet, using the designated wavelength. The other node devices can use any other wavelengths. Whether the home node device is a node device just before the destination can be determined referring to the relaying number indication section.

Embodiment 2

Figure 11:
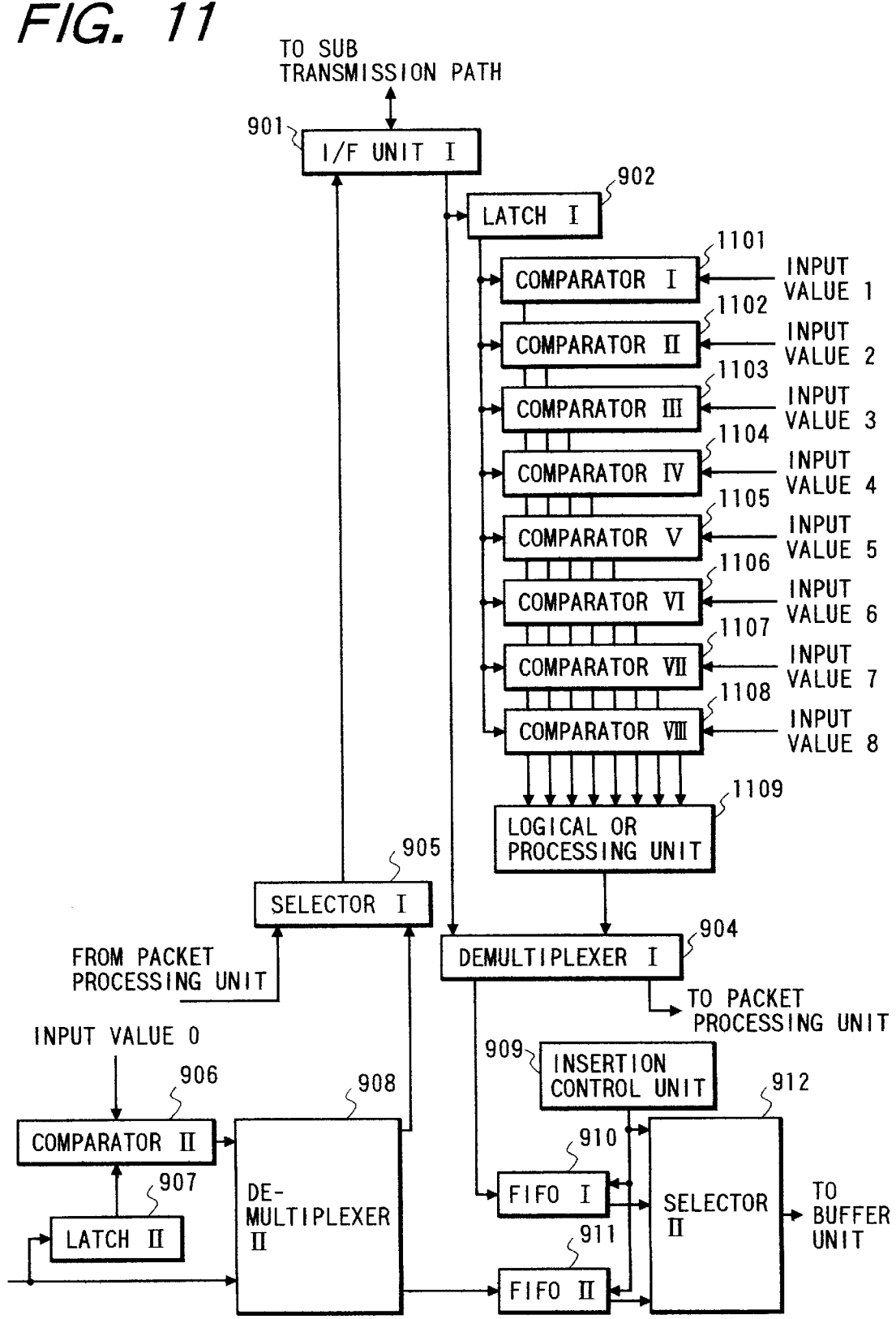
FIG. 11 is a drawing to show the structure of the relaying processing unit in the second embodiment according to the present invention.

FIG. 11 is a second structural example of the relaying processing unit according to the present invention. In FIG. 11, portions denoted by the same reference numerals as in FIG. 9 have the same functions. In FIG. 11, numerals 1101 to 1108 designate comparator I to comparator VIII, respectively, which compare the value of the wavelength designation section with reference input value "1" to "8". If they are coincident, a coincidence signal is output to a logical OR processing unit 1109. Numeral 1109 is the logical OR processing unit, which takes logical OR of coincidence signals output from the comparator I to comparator VIII, and which outputs the insertion instruction signal to a demultiplexer I 904 if the logical OR is positive or outputs the separation instruction signal to the demultiplexer I 904 if the logical OR is negative.

In this second embodiment, the comparator I to comparator VIII compare the value of the wavelength designation section 802 in the packet transmitted from the terminal with the all values "1" to "8" assigned for designating the wavelengths of light signals used upon transmission, and, if the value is not coincident with either one of "1" to "8", it is output to the packet processing unit I 703. Therefore, the packet would not be erroneously transmitted to the adjacent node device even if setting of the wavelength designation section 802 upon assembly of packet in the terminal should include an error of setting a value other than the all values assigned for designating the wavelengths of light signals used upon transmission. Furthermore, the effect of improving the reliability of transmission can be enjoyed by receiving the erroneous packet by the packet processing unit I 703 and returning the error detection signal to the sender terminal.

As described above, the network system, and the node device and communication method for network system according to the present invention permit communication between the node device and the terminals. For example, the individual terminals do not have the terminal connection table, and it becomes possible to provide the node devices, to each of which a plurality of terminals are connected, with the terminal connection table. Therefore, the present invention achieves the effect of enabling to decrease the loads in the large-scale network systems with a lot of terminals, including the loads necessary for processing, such as the preparation, renewal, or the like of a new terminal connection table when a new network system is constructed, when the configuration is changed, or when a new terminal is additionally connected to the network system, and the loads such as management of the contents of the terminal connection table, necessary for the destination terminal to receive the packet sent from each terminal by the destination terminal without an error.

Moreover, even if there is an error in the value of the wavelength designation section or the like, added upon preparation of the header, it can be detected by the packet processing unit of node device, thus improving the reliability of communication.

Embodiment 3

The configurations of the above embodiments do not allow communication between the node devices (or between the packet processing units of node devices). The present embodiment shows a configuration having a means for guiding the packet (received by the reception unit) through the transmission line to the packet processing unit, and a means for guiding the packet from the packet processing unit to the transmission line, in addition to the arrangement of the node device in the foregoing embodiments having the means for guiding the packet from the terminal to the packet processing unit and the means for guiding the packet from the packet processing unit to the terminal.

Figure 12B:
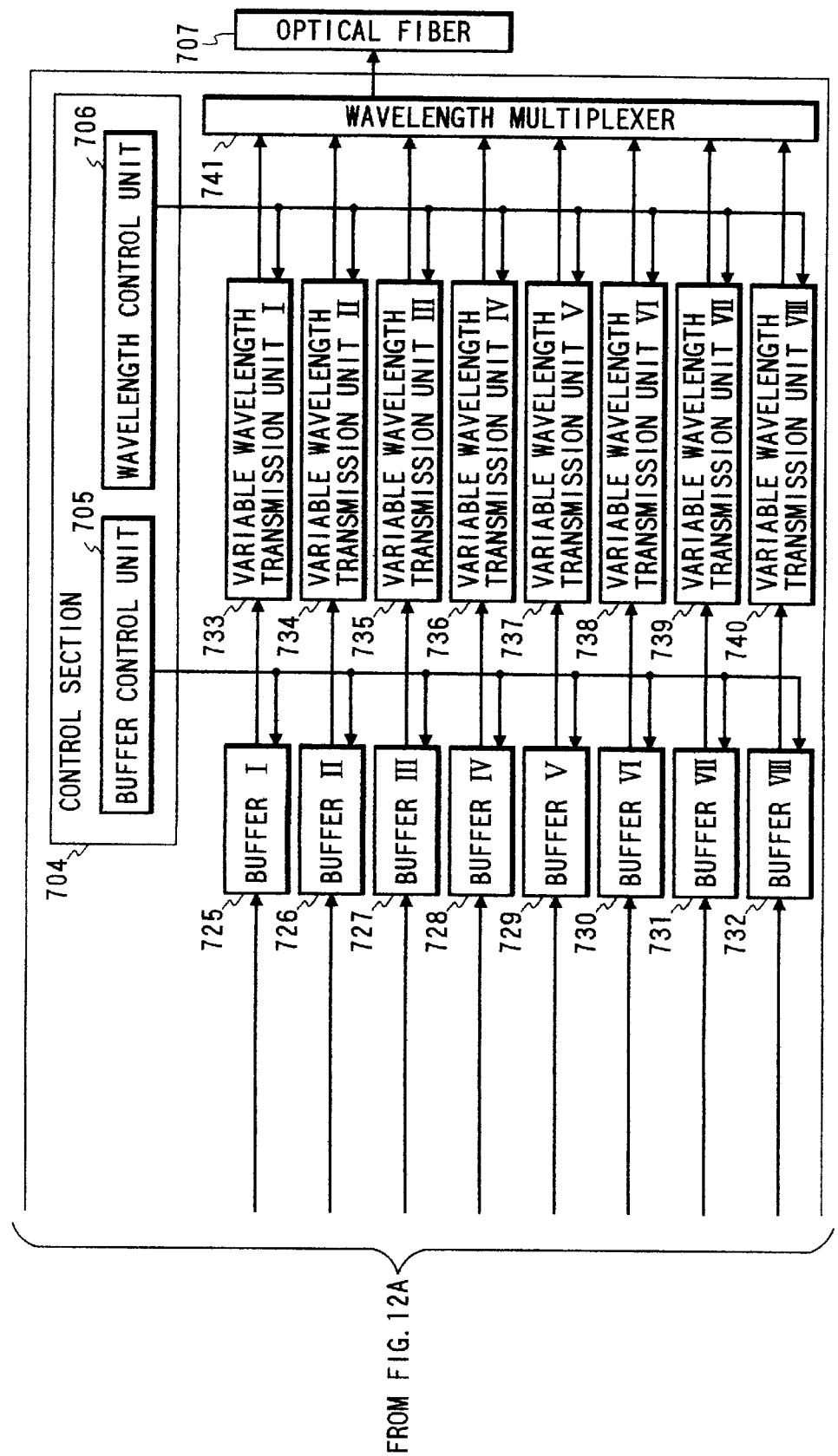
FIG. 12 which is comprised of FIGS. 12A and 12B is a drawing to show the structure of the node device in the third embodiment according to the present invention.

FIGS. 12A and 12B show the structure of the node device in the present embodiment. The relaying processing units I 717 to VIII 724 in FIG. 7A are replaced by route control units I 1201 to VIII 1208 serving as the aforementioned means.

Further, the packet processing unit I 703 in the present embodiment has a function to make a terminal connection table circulation packet for circulating terminal connection information (table) among the node devices and output it to the route control units, and a function to receive through the route control unit the terminal connection table circulation packet transmitted from another node device to perform predetermined processing.

The present embodiment also uses the packet in the structure of FIG. 8. The present embodiment uses the packets of kinds listed in below Table 3.

TABLE 3

| Kind of packet | Value |
| --- | --- |
| Inquiry packet | 0 |
| Answer packet | 2 |
| Terminal connection table circulation packet | 1 |
| Data packet | 3 |

In the terminal connection table circulation packet the connection table is written in the data portion of the packet.

Figure 13:
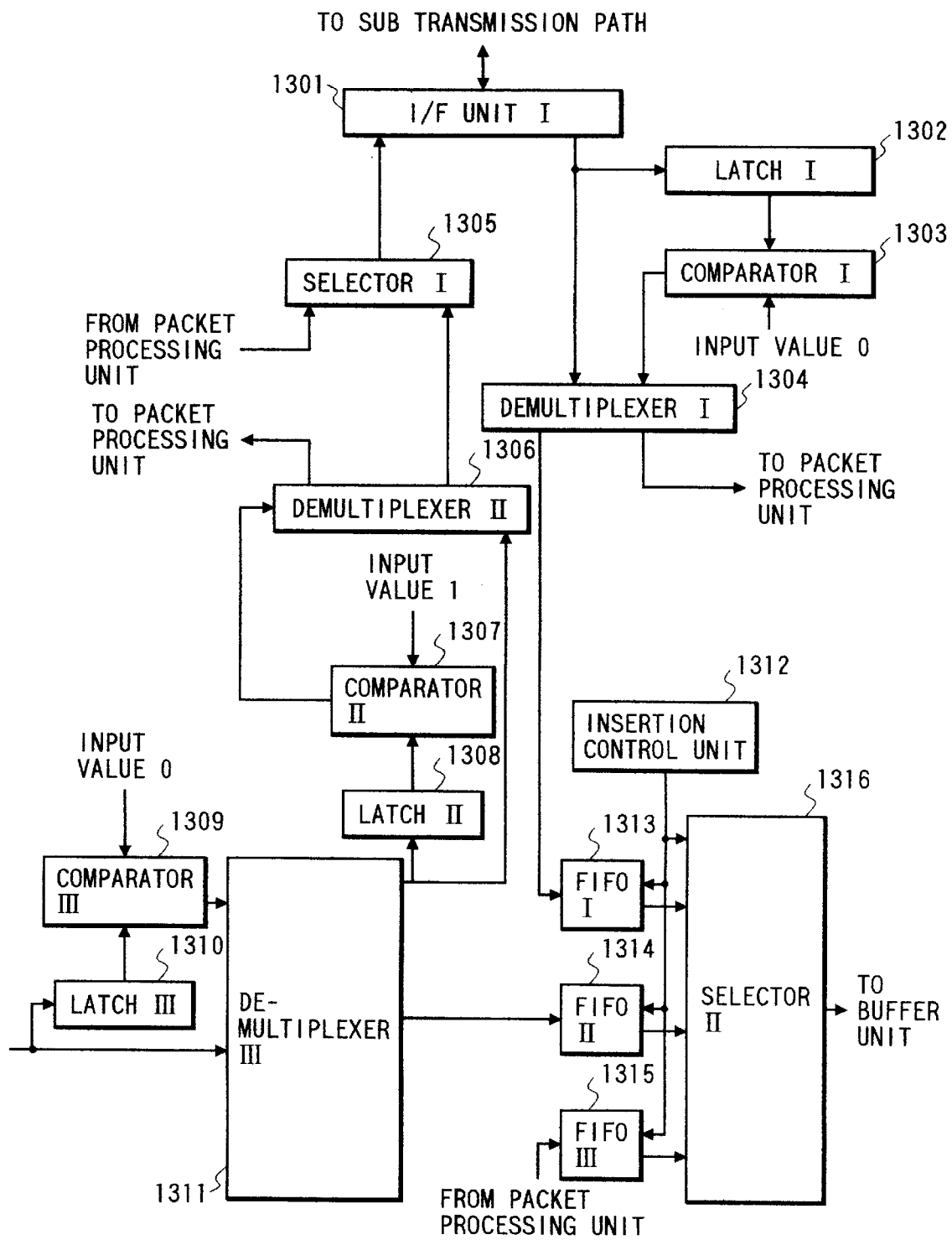
FIG. 13 is a drawing to show the structure of a route control unit in the third embodiment according to the present invention.

FIG. 13 shows a structural example of route control unit I 1201 to route control unit VIII 1208, being the route control means, suitably used in the third embodiment of the node device according to the present invention. The route control unit I 1201 to route control unit VIII 1208 all are constructed in the same internal structure.

In FIG. 13, numeral 1301 designates an I/F unit I, which sends the packet output from a selector I 1305 to the sub-transmission line and which outputs the packet input through the sub-transmission line 742 to 749 to a latch I 1302 and to a demultiplexer I 1304. Numeral 1302 is the latch I, which stores the packet kind identification section 803 of the packet output from the I/F unit I 1301 and outputs the value to a comparator I 1303. Numeral 1303 is the comparator I 1303, which compares the value of the packet kind identification section 803 of the packet output from the latch I 1302 with the value "0" and which outputs the separation instruction to the demultiplexer I 1304 if the value is 0 or outputs the insertion instruction to the demultiplexer I 1304 if the value is not 0. Numeral 1304 is the demultiplexer I, which outputs the packet to the packet processing unit 1 703 if the output of comparison result of the input packet in the comparator I 1303 is the separation instruction or which outputs the packet to FIFO I 1313 if the output is the insertion instruction. Numeral 1305 is the selector I, which designates the input source of packet to be output to the I/F unit I 1301 to the packet output from the packet processing unit I 703 at the end of the packet flow output from a demultiplexer II 1306, thereby inserting the packet output from the packet processing unit I 703 into the packet flow output from the demultiplexer II 1306, and which outputs it to the I/F unit I 1301.

Numeral 1306 is the demultiplexer II, which outputs the packet to the packet processing unit I 703 if the output of comparison result of the input packet in a comparator II 1307 is the separation instruction or outputs the packet to the selector I 1305 if the output is the transmission instruction. Numeral 1307 is the comparator II, which compares the value of the packet kind identification section 803 in the packet output from a latch II 1308 with "1" and which outputs the separation instruction to the demultiplexer II 1306 if it is "1" or outputs the transmission instruction to the demultiplexer II 1306 if the value is not "1". Numeral 1308 is the latch II, which stores the packet kind identification section of the packet output from a demultiplexer III 1311 and outputs the value to the comparator II 1307. Numeral 1309 is a comparator III, which compares the value of the relaying number indication section in the packet output from a latch III 1310 with 0 and which outputs the separation instruction to the demultiplexer III 1311 if the value is 0 or outputs the relaying instruction to the demultiplexer III 1311 if the value is not 0. Numeral 1310 is the latch III, which stores the relaying number indication section 801 of the packet output from the fixed wavelength reception unit and outputs the value to the comparator III 1309. Numeral 1311 is the demultiplexer III, which outputs the input packet to the demultiplexer II 1306 and to the latch II 1308 if the output of comparison result from the comparator III 1309 is the separation instruction and outputs the input packet to FIFO II 1314 if the output is the relaying instruction. The numeral 1312 is an insertion control unit, which controls reading-out of FIFO I 1313, FIFO II 1314, and FIFO III 1315 and which also performs control to insert the packet transmitted from the sub-transmission line 742 to 749 and the packet transmitted from the packet processing unit I 703 into the packet flow output from the fixed wavelength reception unit 709 to 716, by instructing a selector II 1316 as to which FIFO is to be selected. Numeral 1313, numeral 1314, and numeral 1315 are FIFOs (First In First Out), which temporarily store the input packet and which outputs the packet in the input order to the selector II 1316 under the control from the insertion control unit 1312. Numeral 1316 is the selector II, which selects the FIFO storing the packet signal to be output under an instruction from the insertion control unit 1312 and outputs it to the buffer unit 725 to 732.

The structure of the terminals and the structure of the buffers in the present embodiment are the same as in the previous embodiments.

The operation of the third embodiment of the present invention will be explained with an example in which a new network system is constructed in the aforementioned multihop system example shown in FIG. 1, referring to FIGS. 12A and 12B, FIG. 8, FIG. 13, FIG. 10, and FIG. 6. In the following description, the same constituent elements of different terminals and node devices will be denoted by same reference numerals as those shown in FIGS. 12A and 12B, FIG. 13, FIG. 10, FIG. 1, and FIG. 6 for convenience' sake.

First, the node device I 101 makes the terminal connection table as shown in Table 1, using the input/output processing unit 701. After that, the packet processing unit I 703 sets the value of the relaying number indication section 801 to "1", sets the use wavelength designation section 802, which may be an arbitrary value, provisionally to "5" herein, sets the value of the packet kind identification section 803 to the value "1" indicating the "terminal connection table circulation packet", assembles the terminal connection table circulation packet, using the data 804 of the terminal connection table, and outputs it to the FIFO III 1315 of an arbitrary route control unit (say, the route control unit I 1201 in this example). After completion of writing of the terminal connection table circulation packet output from the packet processing unit I 703 to the FIFO III 1315 thereinto, the insertion control unit 1312 finds out the end of the packet flow read out of the FIFO II 1314, switches the input of FIFO which the selector II 1316 is to output, to the input from the FIFO III 1315, stops reading-out of FIFO II 1314, and starts reading-out of FIFO III 1315. Then, after completion of reading-out of the terminal connection table circulation packet written in the FIFO III 1315, the insertion control unit 1312 switches the input of FIFO which the selector II 1316 is to output, again to the input of FIFO II 1314, stops reading-out of FIFO III 1315, and restarts reading-out of FIFO II 1314. Next, the terminal connection table circulation packet output from the selector II 1316 is input into the buffer I 725.

The demultiplexer 601 of the buffer I 725 (FIG. 6) outputs the use wavelength designation section 802 in the header portion of the terminal connection table circulation packet output from the route control unit I 1201 to the latch I 602, the relaying number indication section 801 to the latch II 603, and the packet kind identification section 803 and data portion 804 to the shift register 605, respectively. The latch I 602 stores the use wavelength designation section 802 in the header portion of the terminal connection table circulation packet and outputs the value to the writing address counter 606 and to the selector 607. The latch II 603 stores the relaying number indication section 801 in the header portion of the terminal connection table circulation packet and outputs the value to the down counter 604. The down counter 604 decreases the value of the relaying number indication section 801 in the header portion of the terminal connection table circulation packet output from the latch II 603 to "0", and the result is output to the selector 607. The shift register 605 gives a desired delay to the packet kind identification section 803 and to the data portion 804 in the terminal connection table circulation packet output from the demultiplexer 601 and outputs them to the selector 607. The selector 607 successively selects the use wavelength designation section 802 in the header portion of the terminal connection table circulation packet output from the latch I 602, the value of the relaying number indication section 801 decreased by the down counter 604, and the packet kind identification section 803 and data portion 804 of the terminal connection table circulation packet with the desired delay output from the shift register 605, so as to reconstruct the terminal connection table circulation packet having the decreased value of the relaying number indication section 801, and outputs it to the dual port memory 609. On the other hand, the writing address counter 606 designates the writing start address of the dual port memory 609 in which the terminal connection table circulation packet is to be written, to A5 in accordance with the value "5" of the use wavelength designation section 802 in the header portion of the terminal connection table circulation packet output from the latch I 602, and successively outputs address signals for the packet to be written, to the dual port memory 609. The terminal connection table circulation packet reconstructed through the selector 607 is input into the input port of the dual port memory 609, and is successively written in the memory region V in accordance with the addresses output from the writing address counter 606.

After the terminal connection table circulation packet is written in the memory region V in this manner and when the transmission wavelength of the variable wavelength transmission unit I 733 is set to λ5 under the control of the wavelength control unit 706 in the control section 704, the buffer control unit 705 in the control section 704 outputs the offset value A5 corresponding to the memory region V to the reading address counter 608 of the buffer I 725. Based on this offset value A5, the reading address counter 608 successively increases the counter value, thereby generating addresses for reading out the terminal connection table circulation packet written in the memory region V, and outputs the addresses to the dual port memory 609. According to the reading addresses, the terminal connection table circulation packet is sequentially read out of the output port of the dual port memory 609 to be output to the variable wavelength transmission unit I 733. Since the transmission wavelength of the variable wavelength transmission unit I 733 is set to λ5, the terminal connection table circulation packet is sent as a light signal of the wavelength λ5 from the variable wavelength transmission unit I 733 to the wavelength multiplexer 741, is multiplexed in the wavelength multiplexer 741 with the light signals of the mutually different wavelengths sent out from the other variable wavelength transmission unit II 734 to variable wavelength transmission section VIII 740, is output to the optical fiber 707 (the optical fiber 105 in FIG. 1), and is transmitted to the node device II 102 adjacent on the downstream side.

The terminal connection table circulation packet having been transmitted as the light signal of the wavelength λ5 to the node device II 102 is subjected to the reception processing in the node device II 102. The light signals of the wavelengths λ1 to λ8 having been transmitted through the optical fiber 105 from the node device I 101 are divided by the divider 708 of the node device II 102 to enter the fixed wavelength reception unit I 709 to the fixed wavelength reception unit VIII 716. Since the terminal connection table circulation packet sent out of the node device I 101 is transmitted as the light signal of the wavelength λ5, it is received by the fixed wavelength reception unit V 713 for receiving only the light signal of the wavelength λ5. The terminal connection table circulation packet received by the fixed wavelength reception unit V 713 is output to the route control unit V 1205.

The latch III 1310 of the route control unit V 1205 stores the relaying number indication section 801 of the terminal connection table circulation packet output from the fixed wavelength reception unit V 713, and outputs the value to the comparator III 1309. The comparator III 1309 outputs the separation instruction to the demultiplexer III 1311, because the value of the relaying number indication section 801 in the terminal connection table circulation packet output from the latch III 1310 is "0". The demultiplexer III 1311 receives the separation instruction from the comparator III 1309 and outputs the terminal connection table circulation packet thus input to the demultiplexer II 1306 and to the latch II 1308. The latch II 1308 stores the packet kind identification section of the terminal connection table circulation packet and outputs the value to the comparator II 1307. The comparator II 1307 outputs the separation instruction to the demultiplexer II 1306, because the value of the packet kind identification section in the terminal connection table circulation packet output from the latch II 1308 is "1". The demultiplexer II 1306 receives the separation instruction from the comparator II 1307 and outputs the terminal connection table circulation packet thus input to the packet processing unit I 703.

In the packet processing unit I 703, the terminal connection table is taken out of the data portion 804 in the terminal connection table circulation packet and the numbers in the relaying number indication section are decreased one each to be rewritten. At this time, if the subtraction result is "0", the value is set to "4" being the number of node devices in the network system of the embodiment of the present invention shown in FIG. 1. The terminal connection table thus rewritten is stored and used as a terminal connection table of the instant node device.

Further, the packet processing unit I 703 of the node device II 102 makes the terminal connection table circulation packet, based on the terminal connection table thus rewritten, in the same manner as in the node device I 101, and transmits it to the node device III 103. The terminal connection table circulation packet transmitted from the node device II 102 is transmitted in the same manner as the terminal connection table circulation packet transmitted from the foregoing node device I 101, and is received by the node device III 103. Then the terminal connection table is rewritten in the same manner as described above, and it is stored and used as a terminal connection table of this node device and is transmitted to the node device IV 104. The node device IV 104 similarly rewrites the terminal connection table circulation packet transmitted thereto, and stores and uses it as a terminal connection table of itself. The node device IV 104 transmits the terminal connection table circulation packet thus rewritten to the node device I 101. Since the node device I 101 is the one having made this terminal connection table, upon reception of the terminal connection table circulation packet, the node device I 101 recognizes that the terminal connection table circulation packet is transferred to the all node devices and that the terminal connection table is registered therein, and thus it completes the transmission operation of the terminal connection table.

Next, the data transmission operation of the third embodiment of the present invention will be explained with an example in which after completion of setting of the terminal connection table as described above, data is transmitted from the terminal I 750 connected to the sub-transmission line I 742 of the node device I 101 to the terminal V 754 connected to the sub-transmission line V 746 of the node device IV 104 as a destination.

The sender terminal I 750 for transmitting the data to the terminal V 754 sends an inquiry packet to the node device I 101, prior to transmission of the data, to inquire the number of relaying times necessary upon transmission of data to the destination terminal and the value of use wavelength. For that, the packet processing unit II 1002 of the terminal I 750 writes the value "0" in the use wavelength designation section 802, designates the packet kind identification section 803 as an "inquiry packet", assembles the inquiry packet, using the data of the identification number "11" of its own terminal and the identification number "45" of the terminal V 754 connected to the sub-transmission line V 746 of the node device IV 104 being the destination terminal, and outputs it through the I/F unit II 1001 to the sub-transmission line I 742. The inquiry packet output to the sub-transmission line I 742 is input into the I/F unit I 1301 of the route control unit I 1201 connected through the sub-transmission line I 742 of the node device I 101.

The I/F unit I 1301 of the route control unit I 1201 of the node device I 101 outputs to the latch I 1302 the value of the packet kind identification section 803 in the header portion of the inquiry packet transmitted through the sub-transmission line I 742. The latch I 1302 retains this value and outputs it to the comparator I 1303. The comparator I 1303 compares this value with "0". Since the value of the packet kind identification section 803 in the inquiry packet is set at "0", the comparator I 1303 outputs the separation instruction to the demultiplexer I 1304. The inquiry packet from the I/F unit I 1301 is put in the demultiplexer I 1304, and the demultiplexer I 1304 outputs the input inquiry packet to the packet processing unit I 703 in accordance with the separation instruction from the comparator I 1303.

The packet processing unit I 703 receives the inquiry packet output from the demultiplexer I 1304 of the route control unit I 1201, searches the terminal connection table, using the identification number "45" of the destination terminal of the data portion 804 in the inquiry packet, reads out the values indicating the number of relaying times up to the destination terminal and the reception wavelength, which is the wavelength of the light signal used upon transmission, and, using the data of these values, assembles an answer packet as designating the packet kind identification section 803 as the answer packet. As shown in previous Table 1, the value of the relaying number read out at this time is "3", which is a value indicating three relayings at the home node device I 101, at the node device II 102, and at the node device III 103. Further, read as the value indicating the wavelength of the light signal used upon transmission is "5", which is a value indicating the light signal of the wavelength λ5 received by the fixed wavelength reception unit V 713 for outputting the packet to the route control unit V 1205 to which the sub-transmission line V 746 of the destination of the node device IV 104 is connected.

At the same time, the packet processing unit I 703 reads out the identification number "11" of the sender terminal I 750 in the inquiry packet from the identification number of its own terminal written in the data portion 804 of the inquiry packet, finds out, referring to the terminal connection table, that the route control unit to which the sender terminal of the inquiry packet is connected is the route control unit I 1201 from the value "1" indicating the reception wavelength, and outputs the answer packet to the route control unit I 1201.

The answer packet directed to the terminal I 750 output from the packet processing unit I 703 of the node device I 101 is input into the selector I 1305 of the route control unit I 1201. Subsequently, the answer packet input into the selector I 1305 is output to the I/F unit I 1301 at the end of the packet output from the demultiplexer II 1306 and is input through the sub-transmission line I 742 into the packet processing unit II 1002 after input into the I/F unit II 1001 of the terminal I 750.

Receiving the answer packet, the packet processing unit II 1002 makes the header, using the value "3" of the relaying number indication section 801 corresponding to the terminal V 754 connected to the node device IV 104 being the destination terminal and the value "5" of the use wavelength designation section 802, notified of by the answer packet, and sets the packet kind identification section 803 in the data packet. Then the data packet is assembled together with the transmitted data and is output to the I/F unit II 1001. At this time, the value of the packet kind identification section 803 is "3", indicating the data packet. The I/F unit II 1001 transmits the data packet through the sub-transmission line I 742 to the route control unit I 1201 of the node device I 101.

The I/F unit I 1301 of the route control unit I 1201 of the node device I 101 writes in the latch I 1302 the packet kind identification section 803 of the header portion of the data packet transmitted through the sub-transmission line I 742. The comparator I 1303 compares the value "3" of the packet kind identification section 803 in the data packet stored in the latch I 1302 with the input value "0" for comparison and outputs the insertion instruction to the demultiplexer I 1304, because they do not agree. Receiving this insertion instruction, the demultiplexer I 1304 sequentially writes the data packet output from the I/F unit I 1301 into the FIFO I 1313. After completion of writing of the data packet into the FIFO I 1313, the insertion control unit 1312 finds out the end of the packet flow, which is being read out of the FIFO II 1314, switches the input of FIFO which the selector II 1316 is to output, to the input from the FIFO I 1313, stops reading-out of FIFO II 1314, and starts reading-out of FIFO I 1313. Then, after completion of reading-out of the data packet written in FIFO I 1313, the insertion control unit 1312 switches the input of FIFO which the selector II 1316 is to output, again to the input from the FIFO II 1314, stops reading-out of FIFO I 1313, and restarts reading-out of FIFO II 1314. The data packet output from the selector II 1316 is input into the buffer I 725.

The data packet input into the buffer I 725 is processed to decrease the value of the relaying number indication section 801 to "2" in the same manner as in the case of the previous transmission of the terminal connection table circulation packet, thereafter is written into the memory region V in accordance with the value "5" of the use wavelength designation section 802, and is transmitted as a light signal of the wavelength λ5 to the node device II 102 adjacent on the downstream side under the control of the control section 704.

In the node device II 102 the data packet is subjected to the relaying transmission processing. The data packet sent out as the light signal of the wavelength λ5 from the node device I 101 is divided by the divider 708 of the node device II 102, and is received by the fixed wavelength reception unit V 713 for receiving only the light signal of the wavelength λ5. The data packet received by the fixed wavelength reception unit V 713 is output to the route control unit V 1205. The latch III 1310 of the route control unit V 1205 stores the relaying number indication section 801 of the data packet output from the fixed wavelength reception unit V 713 and the value is output to the comparator III 1309. The comparator III 1309 outputs the relaying instruction to the demultiplexer III 1311, because the value of the relaying number indication section 801 in the data packet output from the latch III 1310 is "2". The demultiplexer III 1311 receives the relaying instruction from the comparator III 1309 to output the input data packet to the FIFO II 1314. The data packet written in the FIFO II 1314 in this manner is read out under the control of the insertion control unit 1312 and is output through the selector II 1316 to the buffer V 729. The data packet input into the buffer V 729 is processed to decrease the value of the relaying number indication section 801 to "1" in the down counter 604 in the same manner as in the buffer I 725 of the node device I 101, and thereafter the packet is reconstructed to be written into the memory region V of the dual port memory 609. After that, the packet is sent as a light signal of the wavelength λ5 in the same manner as in the node device I 101 to be transferred to the node device III 103 adjacent on the downstream side.

The data packet transmitted as the light signal of the wavelength λ5 to the node device III 103 is subjected to the relaying transmission processing in the same manner as in the node device II 102, and is then transmitted as the light signal of the wavelength λ5 to the node device IV 104. At this time, the value of the relaying number indication section 801 is decreased to "0".

The data packet transmitted as the light signal of the wavelength λ5 to the node device IV 104 is received by the fixed wavelength reception unit V 713 of the node device IV 104 and is output to the route control unit V 1205. The latch III 1310 of the route control unit V 1205 stores the relaying number indication section 801 of the data packet output from the fixed wavelength reception unit V 713, and the value is output to the comparator III 1309. The comparator III 1309 outputs the separation instruction to the demultiplexer III 1311, because the value of the relaying number indication section 801 of the data packet output from the latch III 1310 is "0". The demultiplexer III 1311 receives the separation instruction from the comparator III 1309 and outputs the input data packet to the demultiplexer II 1306 and to the latch II 1308. The latch II 1308 stores the packet kind identification section 803 of the data packet and outputs it to the comparator II 1307. The comparator II 1307 compares the packet kind identification section 803 of the data packet output from the latch II 1308 with the value "1" indicating the terminal connection table circulation packet. Since they are not coincident with each other, the comparator outputs the transmission instruction to the demultiplexer II 1306. Receiving this transmission instruction, the demultiplexer II 1306 outputs the data packet output from the demultiplexer III 1311 to the selector I 1305. If there is a packet output from the packet processing unit I 703, the selector I 1305 multiplexes the packet with the data packet and outputs the resultant to the I/F unit I 1301. By this, the data packet is output to the I/F unit I 1301, is transmitted through the sub-transmission line V 746, and thereafter is received by the terminal V 754 being the destination. Then the header portion of the packet is removed and thereafter only the data portion 804 is extracted to be subjected to desired processing.

The data packet, transmitted in this manner from the terminal I 750 connected to the sub-transmission line I 742 of the sender node device I 101 to the terminal V 754 connected to the sub-transmission line V 746 of the node device IV 104, is transmitted as the light signal of the wavelength λ5 from the variable wavelength transmission unit I 733 of the node device I 101, thereafter is subjected to the operation of decreasing the value of the relaying number indication section 801 in the node device II 102 and in the node device III 103, is relayed by the light signal of the wavelength λ5, then is used in the route control unit V 1205 of the node device IV 104 to detect that the value of the relaying number indication section 801 is "0" and that the packet kind identification section 803 is not the value indicating the terminal connection table circulation packet, is separated and transferred to the sub-transmission line V 746, and then is received by the terminal V 754.

Embodiment 4

Figures 14, 14A:
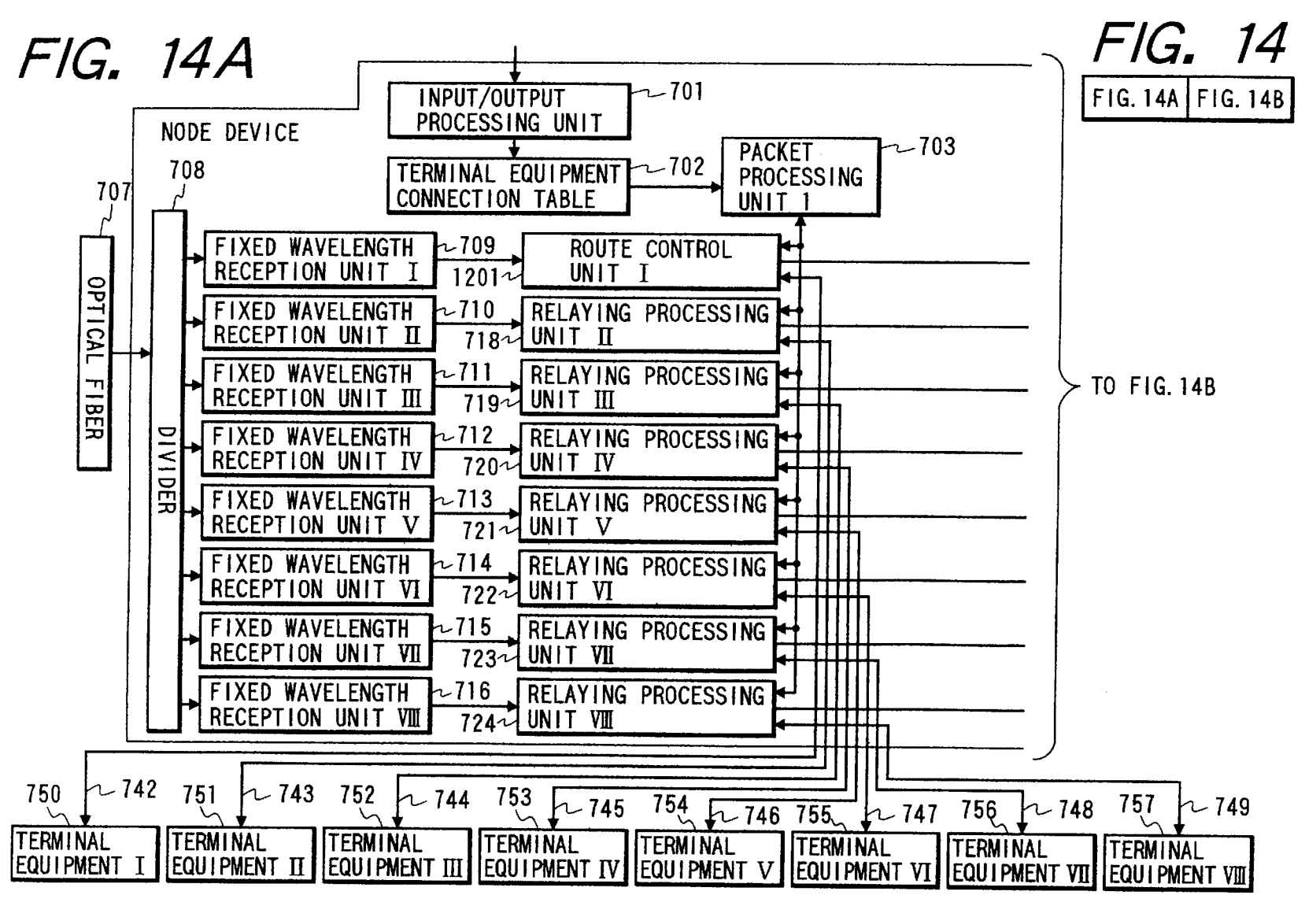
Figure 14B:
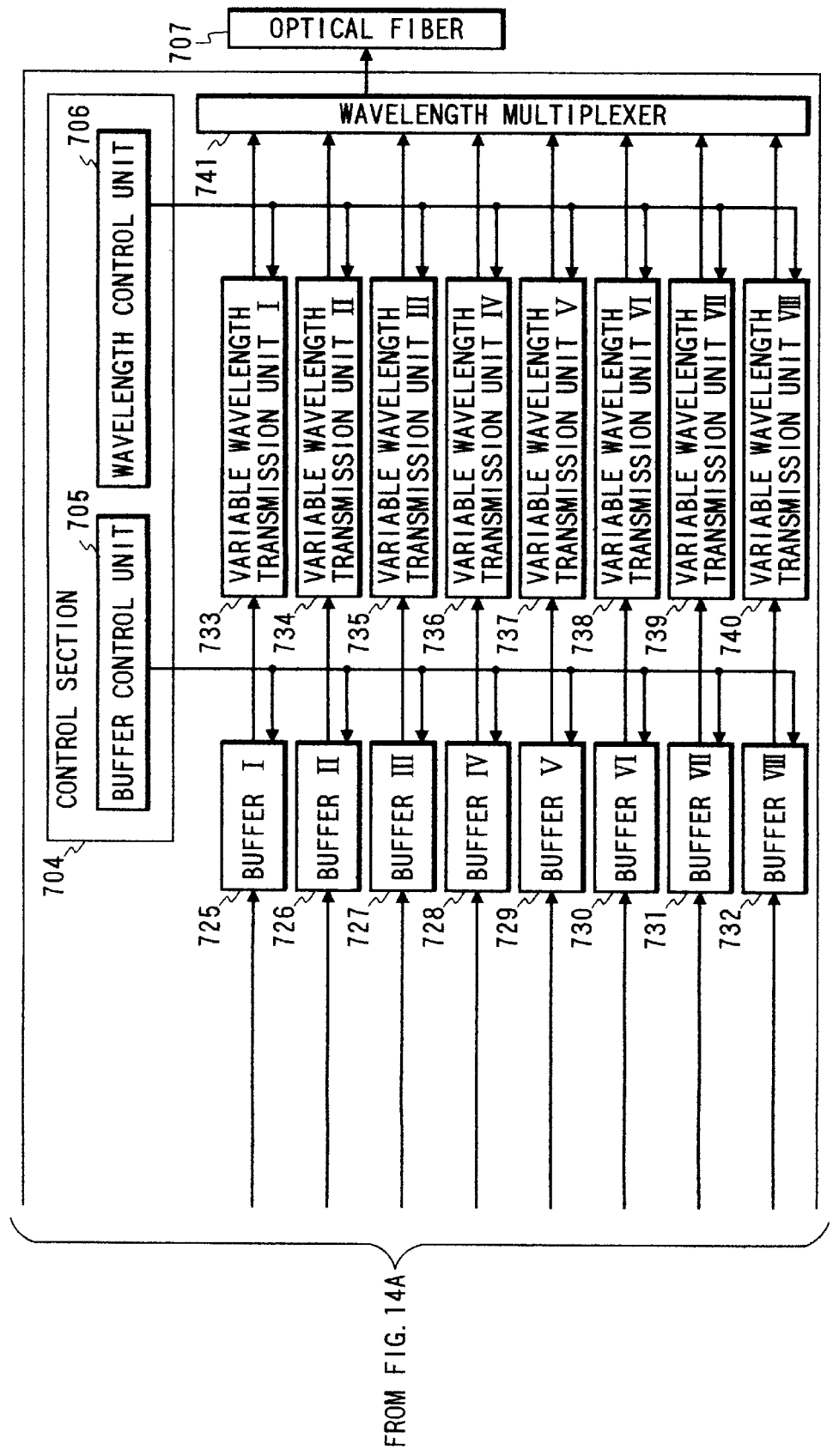
FIG. 14 which is comprised of FIGS. 14A and 14B is a drawing to show the structure of the node device in the fourth embodiment according to the present invention.

FIGS. 14A and 14B show the second structural example of the node device of foregoing Embodiment 3, which is the node device in such structure that only one route control means (route control unit I) among the plural route control means has a function to separate a packet to be output to the packet processing unit out of packets output from the receiving means and to output the packet output from the packet processing unit 703 to the transmitting means. In FIGS. 14A and 14B, the route control unit I 1201 is of the same structure as the route control units of the foregoing third embodiment. The other arrangement than it is the same as in FIGS. 7A and 7B.

In the fourth embodiment of the present invention the node device I 101 makes the terminal connection table as shown in Table 1, using the input/output processing unit 701, in the same manner as in the foregoing third embodiment. Next, the packet processing unit I 703 sets the value of the relaying number indication section 801 to "1", the value of the use wavelength designation section 802 to "1", and the value of the packet kind identification section 803 to the value "1" indicating the "terminal connection table circulation packet", assembles the terminal connection table circulation packet, using the data of the terminal connection table, and outputs it to the FIFO III 1315 of the route control unit I 1201. Here, the reason why the value of the use wavelength designation section 802 is set to "1" is that in each node device of the fourth embodiment of the present invention, the fixed wavelength reception unit for outputting the packet to the route control unit I 1201 is the one I 709 for receiving only the packet transmitted as the light signal of the wavelength λ1 and thus the light signal of the wavelength λ1 needs to be used for transmitting the terminal connection table circulation packet from each node device.

The terminal connection table circulation packet output from the packet processing unit I 703 to the FIFO III 1315 is output to the buffer I 725 from the route control unit I 1201 in the same manner as in the foregoing third embodiment. Since the use wavelength designation section 802 is "1", it is written in the memory region I. After that, it is read out under the control of the control section 704, and is sent as the light signal of the wavelength λ1 from the variable wavelength transmission unit I 733. Then the packet is received by the fixed wavelength reception unit I 709 of the node device II 102. After the route control unit I 1201 checks the relaying number indication section 801 and the packet kind identification section 803, the packet is output to the packet processing unit I 703. In the packet processing unit I 703 the terminal connection table circulation packet is processed in the same manner as in the foregoing third embodiment and is used as a terminal connection table. Then, in the same manner, the terminal connection table circulation packet is transmitted to the node device III 103 and to the node device IV 104 to be processed by the respective packet processing units I 703 and to be used as a terminal connection table. Data transmission between the terminals can be realized as in Embodiments 1 to 3.

In the fourth embodiment of the present invention, only one route control means (the route control unit I) out of the plural route control means is the route control means having the function to separate the packet to be output to the packet processing unit out of the packets output from the receiving means and to output the packet output from the packet processing unit to the transmitting means, and the other route control means (the relaying processing unit II 718 to the relaying processing unit VIII 724) are not provided with this function to simplify the structure, which achieve the effect that the structure of the entire node device can be simplified.

As described above, the arrangements of Embodiments 3, 4 permit communication between the node devices. By this, for example, preparation, renewal, or the like of the terminal connection table can be made in one device and it can be circulated, which can decrease the loads associated with these processing.

Transmission of the information to be circulated among the node devices can be done without referring to the terminal connection-table.

Embodiment 5

Figure 15B:
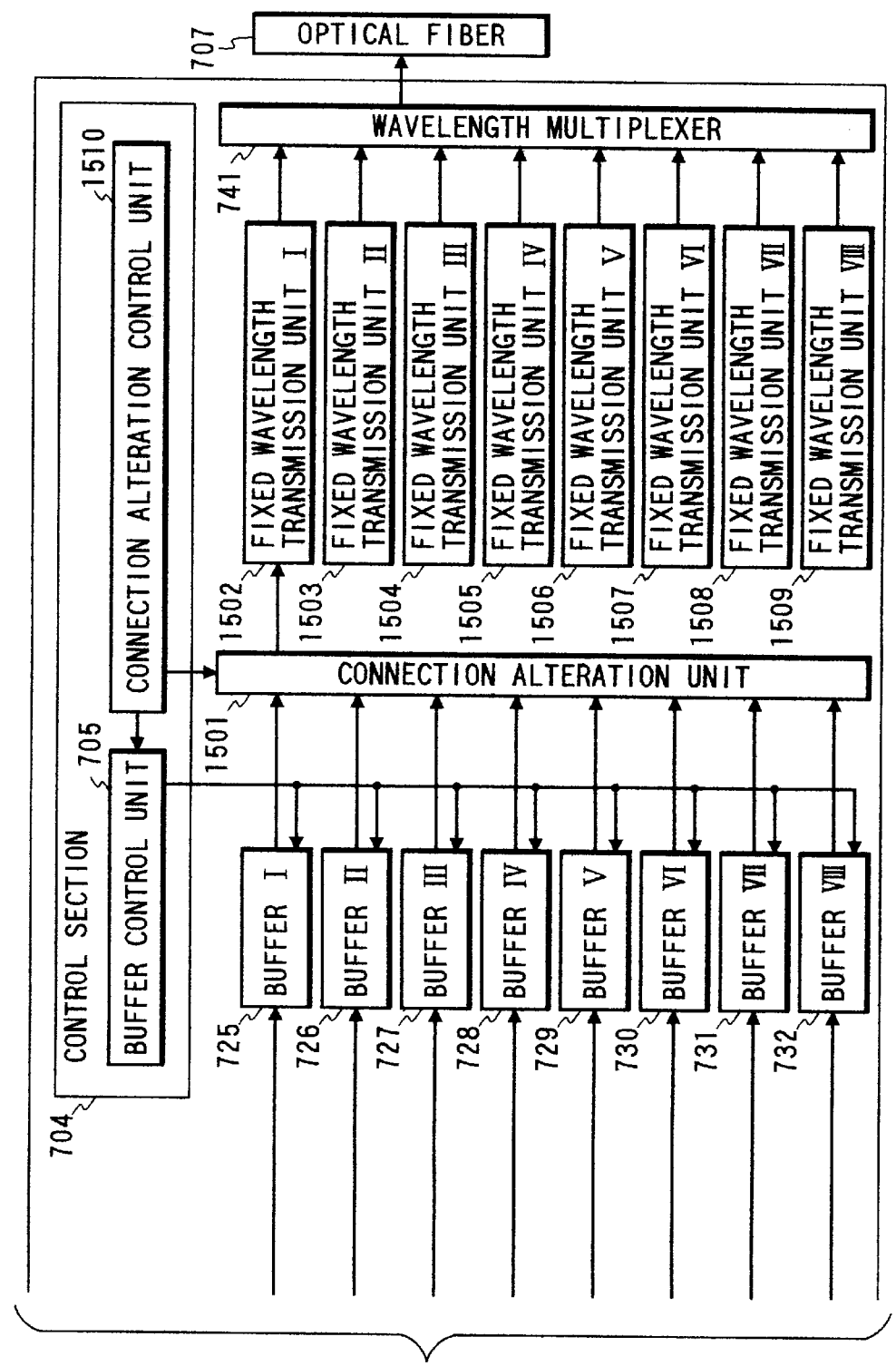
FIG. 15 which is comprised of FIGS. 15A and 15B is a drawing to show the structure of the node device in the fifth embodiment according to the present invention.

The present embodiment employs the node device as illustrated in FIGS. 15A and 15B. In FIGS. 15A and 15B, like portions are denoted by the same reference numerals as those in FIGS. 7A and 7B. The node device of the present embodiment is different from the node device of FIGS. 7A and 7B in that the wavelengths output from the fixed wavelength transmission unit "I" 1502 to the fixed wavelength transmission unit "VIII" 1509 are not variable, it has a connection alteration unit 1501 for altering a connection relation between the buffers and the fixed wavelength transmission units, and it has a connection alteration control unit 1510 for controlling the connection alteration unit 1501. In the present embodiment, the wavelengths of the respective transmission units are fixed, the predetermined wavelengths are assigned to the respective transmission units, and the transmission units that can output the packet from the buffer are altered in a predetermined pattern.

Numeral 1501 is the connection alteration unit as a connection alteration means, input terminal I to input terminal VIII of which are connected to buffer I to buffer VIII, respectively, and output terminal I to output terminal VIII of which are connected to fixed wavelength transmission unit I to fixed wavelength transmission unit VIII, respectively. The input terminal I corresponds to the channel of λ1, and the output terminal I corresponds to the input terminal I. Further, the input terminal II corresponds to λ2 and the output terminal II to the input terminal II. In this manner, the other input terminals correspond to the associated channels and the other output terminals to the associated input terminals. The internal structure of the connection alteration unit will be described hereinafter.

Numerals 1502 to 1509 designate the fixed wavelength transmission unit I to the fixed wavelength transmission unit VIII being the transmission means using a semiconductor laser, which convert a packet output from the connection alteration unit into a light signal of a predetermined wavelength and send the light signal through the wavelength multiplexer to the optical fiber as a physical means of a light wavelength multiplex transmission line. An example of the semiconductor laser is a DFB (Distributed Feed Back) laser in multi-electrode structure. By controlling an injection current amount of each electrode of this DFB laser, λ1 to λ8 are assigned as transmission wavelengths to the transmission unit I to the transmission unit VIII, respectively.

FIG. 16 is a drawing to show the internal structure of the connection alteration unit used in the present embodiment. The connection alteration unit has the eight input terminals and eight output terminals. In FIG. 16, numerals 1601 to 1608 denote selector I to selector VIII. The selector I to selector VIII take in eight signals of the input terminal I to input terminal VIII and outputs a packet supplied from a predetermined input terminal to the output terminal, based on a selection signal described below and output from the connection alteration control unit. This sets the connection relation between the input terminals and the output terminals.

In the above structure, the channels in which the buffers can output the packets can be switched by changing over the input terminals selected by the selectors in the connection alteration unit 1501. Further, the arbitration control becomes unnecessary when the channels, in which the buffers can output the packets, are switched so as to avoid a plurality of input terminals from being connected to one output terminal, which is the same as in foregoing Embodiments 1 to 4.

Figure 17B:
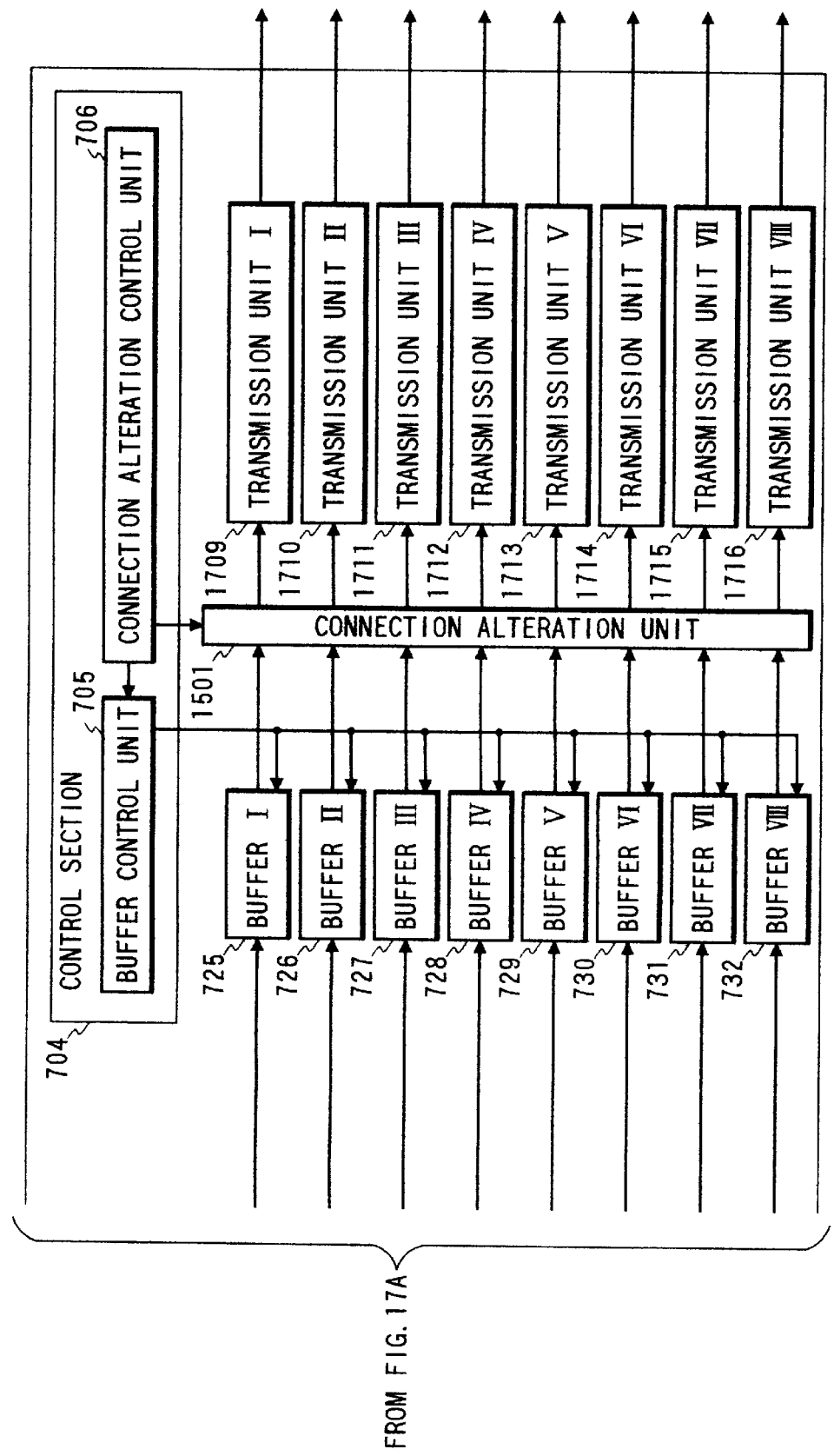
FIG. 17 which is comprised of FIGS. 17A and 17B is a drawing to show another structural example of the node device in the fifth embodiment according to the present invention.

Particularly in this arrangement, since the fixed wavelength transmission unit I to VIII is in one-to-one correspondence with the fixed wavelength reception unit I to VIII of an adjacent node, the node structure as shown in FIGS. 17A and 17B may be employed to connect the transmission units with the associated reception units through respective separate transmission lines. In this case the transmission wavelengths of the respective transmission units do not have to be different from each other. In this case, routing of the transmission lines becomes easier by using a bundle of transmission lines (for example, ribbon fiber) for connection between the transmission units and the reception units associated with each other.

Other Embodiments

The above embodiments showed the examples in which the information transmitted between the terminal and the node device or between the node devices was the connection information of other terminals or the terminal connection information, but the information handled by the present invention is not limited to these. Specific examples of the information that can be handled include various information such as notification of trouble of terminal, notification of opening/interruption of connection, and so on.

In the above embodiments, the first relaying node device is the node device to which the terminal about to transmit the packet is connected, and the node device for finally receiving the packet and outputting it to the terminal, which is the destination node device of packet, is not regarded as a relaying node. It is, however, also possible to regard the final node device also as a relaying node, and then to set the value of the relaying number of times of the packet and the value for determining whether the node should output the packet to the next node device or to the terminal (in the above embodiments the packet is output to the terminal when the relaying number indication section is "0"). Further, arbitrary values can be set for the values of the respective sections in the above packet. The destination information of packet can be constructed of the information indicating the node device to which the destination terminal etc. is connected and the information indicating the channel (wavelength or the like) which the destination terminal etc. can receive.

In the above embodiments, the terminals are connected through the respective sub-transmission lines to each node device. However, the sub-transmission lines stated herein may be used in such a mode that not only the terminals, but also another network are connected thereto and that further terminals are connected to the another network. In that case, it is preferable to add a sub-address of the destination terminal in the another network to the packet.

The above embodiments showed the examples of wavelength multiplexing or spatial multiplexing using the light signals for connection between the node devices, but the present invention is by no means limited to the network systems using the light signals but may be applied to those using ordinary electric signals. It is also possible to apply the frequency multiplex method with electric signals to the present invention.

What is claimed is:

1. A node device for performing packet communication using a transmission line including a plurality of channels, said node device connectable to a network having a plurality of node devices, each of said plurality of node devices connecting said transmission line to a sub-transmission line, said node device comprising:

packet processing means for processing a packet;

first means corresponding to each of said plurality of channels, for outputting a packet input on a predetermined one of said plurality of channels to one of a side of said sub-transmission line and a side of said transmission line;

second means corresponding to each of said plurality of channels, for outputting a packet transmitted through said sub-transmission line to one of said transmission line side and said packet processing means side;

third means for outputting a packet supplied thereto from said packet processing means to said sub-transmission line side;

memory means corresponding to each of said first means and said second means, for temporarily storing a packet output from each of said first means and said second means; and transmission means for transmitting outputs from said memory means in said channel different from each other.

2. The node device according to claim 1, wherein a terminal is connected to said sub-transmission line.

3. The node device according to claim 2, wherein said packet processing means processes a packet having been transmitted from said terminal through said sub-transmission line or a packet to be transmitted through said sub-transmission line to said terminal, thereby effecting transmission of information between said terminal and said node device.

4. The node device according to claim 3, said node device further storing connection information of each terminal in said network system, wherein said packet processing means, when receiving a packet of an inquiry about connection information of another terminal transmitted from said terminal, processes said inquiry with reference to said connection information of each terminal.

5. The node device according to claim 1, wherein said first means outputs a packet supplied thereto from said transmission line to one of said sub-transmission line side, said transmission line side, and said packet processing means side, and wherein said third means outputs a packet supplied thereto from said packet processing means to one of said sub-transmission line side and said transmission line side.

6. The node device according to claim 5, wherein said packet processing means processes a packet having been transmitted from another node device through said transmission line or a packet to be transmitted through said transmission line to another node device, thereby effecting transmission of information between said node devices.

7. The node device according to claim 1, wherein each of said first, second, and third means determines a side for outputting said packet in accordance with information of a predetermined section in a packet supplied thereto.

8. The node device according to claim 1, wherein a single means serves as said first, second, and third means.

9. The node device according to claim 1, wherein said transmission means can switch the channels for transmitting the outputs from said respective memory means.

10. The node device according to claim 9, wherein switching of said channels for transmission is carried out according to a predetermined pattern.

11. The node device according to claim 1, wherein said third means also corresponds to each of said plurality of channels.

12. The node device according to claim 11, said memory means further corresponding to said third means, and said memory means temporarily storing a packet output from each of said first means, said second means, and said third means.

13. The node device according to claim 12, wherein said transmission means can switch the channels for transmitting the outputs from said respective memory means.

14. The node device according to claim 13, wherein switching of said channels for transmission is carried out according to a predetermined pattern.

15. A network system comprising:

a transmission line comprising a plurality of channels; and a plurality of node devices for performing packet communication using said transmission line, said plurality of node devices connecting said transmission line to sub-transmission lines, each of said plurality of node devices comprising:

packet processing means for processing a packet;

first means corresponding to each of said plurality of channels, for outputting a packet input on a predetermined one of said plurality of channels to one of said sub-transmission line side and said transmission line side;

second means corresponding to each of said plurality of channels, for outputting a packet transmitted through said sub-transmission line to one of said transmission line side and said packet processing means side;

third means for outputting a packet supplied thereto from said packet processing means to said sub-transmission line side;

memory means corresponding to each of said first means and said second means, for temporarily storing a packet output from each of said first means and said second means; and transmission means for transmitting outputs from said memory means in said channel different from each other.

16. The network system according to claim 15, wherein a terminal is connected to said sub-transmission line.

17. The network system according to claim 16, wherein said packet processing means processes a packet having been transmitted from said terminal through said sub-transmission line or a packet to be transmitted through said sub-transmission line to said terminal, thereby effecting transmission of information between said terminal and said node device.

18. The network system according to claim 17, said node device further storing connection information of each terminal in said network system, wherein said packet processing means, when receiving a packet of an inquiry about connection information of another terminal transmitted from said terminal, processes said inquiry with reference to said connection information of each terminal.

19. The network system according to claim 15, wherein said first means outputs a packet supplied thereto from said transmission line to one of said sub-transmission line side, said transmission line side, and said packet processing means side, and wherein said third means outputs a packet supplied thereto from said packet processing means to one of said sub-transmission line side and said transmission line side.

20. The network system according to claim 19, wherein said packet processing means processes a packet having been transmitted from another node device through said transmission line or a packet to be transmitted through said transmission line to another node device, thereby effecting transmission of information between said node devices.

21. The network system according to claim 15, wherein each of said first, second, and third means determines a side for outputting said packet in accordance with information of a predetermined section in a packet supplied thereto.

22. The network system according to claim 15, wherein a single means serves as said first, second, and third means.

23. The network system according to claim 15, wherein said transmission means can switch the channels for transmitting the outputs from said respective n memory means.

24. The network system according to claim 23, wherein switching of said channels for transmission is carried out according to a predetermined pattern.

25. The network system according to claim 15, wherein said third means also corresponds to each of said plurality of channels.

26. The network system according to claim 25, said memory means further corresponding to each of said third means, and said memory means temporarily storing a packet output from each of said first means, said second means, and said third means.

27. The network system according to claim 26, wherein said transmission means can switch the channels for transmitting the outputs from said respective memory means.

28. The network system according to claim 27, wherein switching of said channels for transmission is carried out according to a predetermined pattern.

29. A communication method in a network system for communication using a packet, the network system including a transmission line and a plurality of node devices for connecting terminals to the transmission line, comprising the steps of:

storing information indicative of a number for which relaying is performed by the node devices in a memory unit, by the node device until a packet reaches the node device connected to a second terminal when the packet is transmitted from a first terminal to the second terminal; and controlling transmission of the packet from the first terminal to said second terminal based on the information indicative of the relayed number stored in said storing step.

30. The communication method according to claim 29, wherein the information stored in said storing step includes connection information of each of the terminals in the network system, and the connection information of the other terminal is transmitted between the terminal and the node device.

31. The communication method according to claim 30, further comprising:

transferring, using packet processing means in the node device, the information between the terminal and the node device by processing one of the packet transmitted from a side of the first terminal and the packet transmitted to a side of the first terminal;

transmitting, from the first terminal to the packet processing means, an inquiring packet for requesting the connection information of the second terminal before transmitting the packet to the second terminal, and transmitting to the first terminal a response packet, in said packet processing means, indicative of the connection information of the second terminal based on the connection information stored in said storing step, in accordance with contents of the inquiring packet.

32. The communication method according to claim 29, wherein the information stored in said storing step includes information indicative of the node device connected to each of the terminals.

33. The communication method according to claim 29, wherein said node device includes packet processing means for performing transfer of the information between the terminals and the node device by processing one of the packet transmitted from the first terminal side and the packet transmitted to the first terminal side.

34. The communication method according to claim 31, further comprising:

adding, using the first terminal, the packet transmitted to the second terminal to the information indicative of the relayed number when the response packet is received, and relaying, using the node device, the received packet to which the information indicative of the relayed number is added changing the information indicative of the relayed number so that the information indicative of the relayed number is information indicative of a number for which the information is relayed after the self node device.

35. The communication method according to claim 29, wherein the transmission line includes a plurality of channels, and the connection information of each of the terminals includes information indicative of the channels to which each of the terminals is connected.

36. A communication method in a network system having a plurality of node devices, each of the plurality of node devices performing packet communication using a transmission line having a plurality of channels, said plurality of node devices connecting terminals to the transmission line, said method comprising the steps of:

storing in a storing unit connection information indicative of a channel to which each of the terminals is connected in the network system; and selecting the channel to which a packet to be transmitted is output, wherein when the packet is transmitted from the first terminal to the second terminal, information indicative of the channel to which the second terminal is connected is added to the packet, and the packet is transmitted on the channel to which the second terminal is connected, in the node device before the node device to which the second terminal is connected.

37. The communication method according to claim 29, further comprising:

transferring, using packet processing means in the node device, the information between the terminal and the node device by processing one of the packet transmitted from a side of the first terminal and the packet transmitted to a side of the first terminal; and selecting an output destination such that the packet transmitted from the first terminal is output to one of a side of the transmission line and a side of the packet processing means.

38. The communication method according to claim 29, further comprising:

processing, using packet processing means in the node device, one of the packet transmitted from a side of the first terminal and the packet transmitted to a side of the first terminal and processing one of the packet transmitted from the other node device and the packet transmitted to the other node device, wherein transfer of the information between the terminal and the node device and transmission of the information between the node devices are performed in said processing step.

39. The communication method according to claim 38, further comprising:

selecting that the packet transmitted from the other node device is to be output to one of said transmission line side, said packet processing means side, and said terminal side.

40. The communication method according to claim 38, wherein the information transmitted between said node devices includes connection information of each of the terminals in the network system.

41. The communication method according to claim 36, further comprising steps of:

transferring, using packet processing means in the node device, the information between the terminal and the node device by processing one of the packet transmitted from the first terminal side and the packet transmitted to the first terminal side, transmitting to the packet processing means from the first terminal an inquiring packet requesting the connection information of the second terminal, prior to transmitting the packet to the second terminal, and transmitting a response packet indicative of the connection information of the second terminal based on the connection information stored in said storing step to the first terminal in accordance with contents of the inquiring packet.

42. The communication method according to claim 36, wherein the information stored in said storing step includes information indicative of the node device to which each of the terminals is connected.

43. The communication method according to claim 36, further comprising:

transferring, using packet processing means in the node device, the information between the terminal and the node device by processing one of the packet transmitted from the first terminal side and the packet transmitted to the first terminal side.

44. The communication method according to claim 41, wherein when the packet is transmitted from the first terminal to the second terminal, the information stored in said storing step includes information indicative of a number for which relaying is performed by the node device until the packet reaches the node device to which the second terminal is connected, said communication method further comprising steps of:

adding, using the first terminal, the packet transmitted to the second terminal, to the information indicative of the relayed number when the response packet is received, and relaying, using the node device, the packet to which the information indicative of the relayed number is added, changing the information indicative of the relayed number so that the information indicative of the relayed number is the information indicative of a number for which the information is relayed after the self node device.

45. The communication method according to claim 36, further comprising steps of:

transferring, using packet processing means in the node device, the information between the terminal and the node device by processing one of the packet transmitted from the first terminal side and the packet transmitted to the first terminal side, comprising:

selecting an output destination such that the packet transmitted from the first terminal is output to one of the transmission line side and the packet processing means side.

46. The communication method according to claim 36, further comprising steps of:

processing, using packet processing means in the node device, one of the packet transmitted from the first terminal side and the packet transmitted to the first terminal side and processing one of the packet transmitted from the other node device and the packet transmitted to the other node device, wherein transfer of the information between the terminal and the node device and transmission of the information between the node devices are performed in said processing step.

47. The communication method according to claim 46, further comprising:

selecting an output destination that the packet transmitted from the other node device is output to one of the transmission line side and the terminal side.

48. A control method of a node device for performing packet communication using a transmission line having a plurality of channels, said node device connectable to a network system having a plurality of node devices connecting the transmission line to sub-transmission lines, the network system including packet processing means for processing a packet, said control method comprising:

a first step for outputting a packet input on a predetermined one of the plurality of channels to one of a side of the sub-transmission line and a side of the transmission line, in first means corresponding to each of the plurality of channels;

a second step for outputting a packet transmitted through the sub-transmission line to one of the transmission line side and the packet processing means side, in second means corresponding to each of the plurality of channels;

a third step for outputting a packet supplied from the packet processing means to the sub-transmission line side;

a storing step for temporarily storing the packet output from the first means and the second means to memory means corresponding to each of the first means and the second means; and a transmission step for transmitting outputs from the memory means in the channels different from each other.

49. The control method according to claim 48, wherein the terminal is connected to the sub-transmission line.

50. The control method according to claim 49, wherein in the packet processing means, transmission of the information between the terminal and the node device is performed by processing one of the packet transmitted through the sub-transmission line from the terminal and the packet transmitted to the terminal through the sub-transmission line.

51. The control method according to claim 50, further comprising the steps of:

storing in the node device connection information of each of the terminals in the network system;

receiving, by the packet processing means, the packet inquiring connection information of the other terminal transmitted from the terminal; and performing processing according to the packet inquiring the connection information of the other terminal received in said receiving step, based on the stored connection information of each of the terminals.

52. The control method according to claim 48, wherein said first step outputs the packet input from the transmission line to one of the sub-transmission line side, the transmission line side, and the packet processing means side, and said third step outputs the packet input from the packet processing means to one of the sub-transmission line side and the transmission line side.

53. The control method according to claim 52, wherein in the packet processing means, transmission of the information between the node devices is performed by processing one of the packet transmitted through the transmission line from the other node device and the packet transmitted to the other node device through the transmission line.

54. The control method according to claim 48, wherein said first step, said second step, and said third step determine a side of outputting the packet in accordance with the information of a predetermined section of the input packet.

55. The control method according to claim 48, wherein single means serves as said first means, said second means, and said third means.

56. The control method according to claim 48, wherein said transmission step can switch the channel for transmitting output from each of the storing means.

57. The control method according to claim 48, wherein the switching of the channel is performed in accordance with a predetermined pattern.

58. The control method according to claim 48, wherein the third means also corresponds to each of the plurality of channels.

59. The control method according to claim 58, wherein the memory means also corresponds to each of the third means, said memory step temporarily storing a packet output from each of the first means, the second means, and the third means in the memory means.

60. The control method according to claim 59, wherein said transmission step can switch the channel for transmitting output from each of the storing means.

61. The control method according to claim 60, wherein the switching of the channel is performed in accordance with a predetermined pattern.

62. The node device according to claim 1, wherein the packet input to said packet processing means is a packet transmitted from the other node device using said plurality of channels.

63. The node device according to claim 1, wherein the packet input to said packet processing means is a packet transmitted from the other node device using a specific one of said plurality of channels.

64. The network system according to claim 15, wherein the packet input to said packet processing means is a packet transmitted from the other node device using said plurality of channels.

65. The network system according to claim 15, wherein the packet input to said packet processing means is a packet transmitted from the other node device using a specific one of said plurality of channels.

66. The communication method according to claim 32, wherein the transmission line includes a plurality of channels, and said transmission step can be performed on any of the plurality of channels when the information stored in said storing step is provided to the other node device.

67. The communication method according to claim 32, wherein the transmission line includes a plurality of channels, and said transmission step can be performed on a specific one of the plurality of channels when the information stored in said storing step is provided to the other node device.

68. The communication method according to claim 36, wherein said transmission step can be performed on any of the plurality of channels when connection information indicative of the channel to which each of the terminals is connected is provided to the other node device.

69. The communication method according to claim 36, wherein said transmission step is performed on a specific one of the plurality of channels when connection information indicative of the channel to which each of the terminals is connected is provided to the other node device.

70. The control method according to claim 48, wherein the packet input to the packet processing means is a packet transmitted from the other node device using the plurality of channels.

71. The control method according to claim 48, wherein the packet input to the packet processing means is a packet transmitted from the other node device using a predetermined one of the plurality of channels.

* * * * *

UNITED STATES PATENT AND TRADEMARK OFFICE
CERTIFICATE OF CORRECTION

PATENT NO. : 5,848,059

DATED : December 8, 1998

INVENTOR(S): MITSURU YAMAMOTO

It is certified that error appears in the above-identified patent and that said Letters Patent is hereby corrected as shown below:

COLUMN 9,
Line 9, "the" should be deleted; and
Line 28, "connected , to" should read --connected to--.

COLUMN 15,
Line 13, "and." should read --and--.

COLUMN 17,
Line 54, "the" should be deleted.

COLUMN 18,
Line 23, "the" should be deleted.

COLUMN 20,
Line 31, "outputs" should read --output--.

COLUMN 27,
Line 47, "these" should read --this--; and
Line 50, "connection-table." should read --connection table.--.

COLUMN 28,
Line 37, "outputs" should read --output--.

UNITED STATES PATENT AND TRADEMARK OFFICE
CERTIFICATE OF CORRECTION

PATENT NO.  : 5,848,059

DATED       : December 8, 1998

INVENTOR(S) : MITSURU YAMAMOTO

It is certified that error appears in the above-identified patent and that said Letters Patent is hereby corrected as shown below:

COLUMN 29,
Line 29, "the" should be deleted.

Signed and Sealed this

Twenty-first Day of September, 1999

Attest:

Q. TODD DICKINSON

*Attesting Officer*   Acting Commissioner of Patents and Trademarks